(12) United States Patent
Imaoka

(10) Patent No.: US 8,780,451 B2
(45) Date of Patent: Jul. 15, 2014

(54) ZOOM LENS SYSTEM, INTERCHANGEABLE LENS APPARATUS AND CAMERA SYSTEM

(71) Applicant: Panasonic Corporation, Osaka (JP)

(72) Inventor: Takuya Imaoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 15 days.

(21) Appl. No.: 13/754,470

(22) Filed: Jan. 30, 2013

(65) Prior Publication Data

US 2013/0141628 A1   Jun. 6, 2013

Related U.S. Application Data

(63) Continuation of application No. PCT/JP2011/006967, filed on Dec. 14, 2011.

(30) Foreign Application Priority Data

Dec. 22, 2010  (JP) .................................. 2010-286699

(51) Int. Cl.
*G02B 15/14* (2006.01)
*G02B 9/00* (2006.01)
*G02B 13/04* (2006.01)

(52) U.S. Cl.
USPC ........... 359/680; 359/682; 359/683; 359/684; 359/685; 359/686; 359/740; 359/753; 359/781

(58) Field of Classification Search
USPC ................. 359/680, 740, 682–686, 753, 781
See application file for complete search history.

(56) References Cited

U.S. PATENT DOCUMENTS

| 5,078,481 | A | 1/1992 | Nakayama et al. | |
|---|---|---|---|---|
| 7,508,592 | B2* | 3/2009 | Harada | 359/680 |
| 2004/0130647 | A1 | 7/2004 | Kuba | |
| 2005/0063069 | A1* | 3/2005 | Nishimura | 359/680 |
| 2006/0209425 | A1* | 9/2006 | Nishimura | 359/680 |
| 2006/0221461 | A1* | 10/2006 | Shibayama | 359/686 |

(Continued)

FOREIGN PATENT DOCUMENTS

| JP | 03-092808 A | 4/1991 |
|---|---|---|
| JP | 2002-228930 A | 8/2002 |
| JP | 2004-205796 A | 7/2004 |
| JP | 2005-092056 A | 4/2005 |
| JP | 2008-176271 A | 7/2008 |
| JP | 2010-175954 A | 8/2010 |
| JP | 2011-095488 A | 5/2011 |

OTHER PUBLICATIONS

International Search Report mailed Mar. 19, 2012 issued in corresponding International Application No. PCT/JP2011/006967.

*Primary Examiner* — Evelyn A. Lester
(74) *Attorney, Agent, or Firm* — McDermott Will & Emery LLP

(57) ABSTRACT

A zoom lens system comprising a negative first lens unit, a positive second lens unit, a negative third lens unit, and a positive fourth lens unit, wherein the second lens unit is composed of an object-side second lens unit and an image-side second lens unit, the object-side second lens unit has positive optical power, an aperture diaphragm is located between the object-side second lens unit and the image-side second lens unit, and the conditions: $-0.5 < f_{2O}/f_{2I} < 1.0$ and $0.12 < d_{2O}/f_W < 0.35$ ($f_{2O}$: a composite focal length of the object-side second lens unit, $f_{2I}$: a composite focal length of the image-side second lens unit, $d_{2O}$: an optical axial distance from a most object side lens surface of the object-side second lens unit to the aperture diaphragm, $f_W$: a focal length of the entire system at a wide-angle limit) are satisfied.

8 Claims, 16 Drawing Sheets

(56) References Cited

U.S. PATENT DOCUMENTS

| | | |
|---|---|---|
| 2007/0058265 A1* | 3/2007 | Nishimura .................... 359/680 |
| 2008/0174881 A1* | 7/2008 | Nishimura .................... 359/686 |
| 2009/0002841 A1* | 1/2009 | Yamamoto et al. ........... 359/684 |
| 2009/0059388 A1* | 3/2009 | Miyata et al. ................. 359/686 |
| 2009/0231708 A1* | 9/2009 | Shibata et al. ................ 359/557 |
| 2009/0257130 A1* | 10/2009 | Iwama .......................... 359/682 |
| 2010/0195207 A1 | 8/2010 | Uchida et al. |
| 2011/0102660 A1 | 5/2011 | Mihara et al. |
| 2012/0057247 A1* | 3/2012 | Mimura et al. ............... 359/686 |

* cited by examiner

ZOOM LENS SYSTEM, INTERCHANGEABLE LENS APPARATUS AND CAMERA SYSTEM

RELATED APPLICATIONS

This application is a Continuation of International Application No. PCT/JP2011/006967, filed on Dec. 14, 2011, which in turn claims the benefit of Japanese Application No. 2010-286699, filed on Dec. 22, 2010, the disclosures of which Applications are incorporated by reference herein.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length without the necessity of lens replacement.

Zoom lens systems having excellent optical performance from a wide-angle limit to a telephoto limit have been desired as zoom lens systems to be used in interchangeable lens apparatuses. Various kinds of zoom lens systems each having a negative lens unit located closest to an object side, and a multiple-unit construction have been proposed.

Japanese Laid-Open Patent Publication No. 2005-092056 discloses a zoom lens having a four-unit construction of negative, positive, negative, and positive, wherein the interval between the first lens unit and the second lens unit decreases, the interval between the second lens unit and the third lens unit increases, and the interval between the third lens unit and the fourth lens unit decreases at a telephoto limit in comparison with at a wide-angle limit during zooming.

Japanese Laid-Open Patent Publication No. 2008-176271 discloses a variable magnification optical system having a four-unit construction of negative, positive, negative, and positive, wherein the interval between the second lens unit and the third lens unit increases, and the interval between the third lens unit and the fourth lens unit decreases during magnification change from a wide-angle limit to a telephoto limit, and wherein the whole of the third lens unit or a part of the third lens unit, as an image blur compensating lens unit, moves in a direction perpendicular to an optical axis.

SUMMARY

The present disclosure provides a compact and lightweight zoom lens system having short overall length of lens system and small outer diameter of lens system, as well as in which various aberrations are sufficiently compensated and optical performance is excellent. Further, the present disclosure provides an interchangeable lens apparatus and a camera system each employing the zoom lens system.

The novel concepts disclosed herein were achieved in order to solve the foregoing problems in the related art, and herein is disclosed:

a zoom lens system, in order from an object side to an image side, comprising a first lens unit having negative optical power, a second lens unit having positive optical power, a third lens unit having negative optical power, and a fourth lens unit having positive optical power, wherein the second lens unit is, in order from the object side to the image side, composed of an object-side second lens unit and an image-side second lens unit, the object-side second lens unit has positive optical power, an aperture diaphragm is located between the object-side second lens unit and the image-side second lens unit, and the following conditions (1) and (2) are satisfied:

$$-0.5 < f_{2O}/f_{2I} < 1.0 \quad (1)$$

$$0.12 < d_{2O}/f_W < 0.35 \quad (2)$$

where $f_{2O}$ is a composite focal length of the object-side second lens unit, $f_{2I}$ is a composite focal length of the image-side second lens unit, $d_{2O}$ is an optical axial distance from a most object side lens surface of the object-side second lens unit to the aperture diaphragm, and $f_W$ is a focal length of the entire system at a wide-angle limit.

The novel concepts disclosed herein were achieved in order to solve the foregoing problems in the related art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal, wherein the zoom lens system, in order from an object side to an image side, comprises a first lens unit having negative optical power, a second lens unit having positive optical power, a third lens unit having negative optical power, and a fourth lens unit having positive optical power, in which the second lens unit is, in order from the object side to the image side, composed of an object-side second lens unit and an image-side second lens unit, the object-side second lens unit has positive optical power, an aperture diaphragm is located between the object-side second lens unit and the image-side second lens unit, and the following conditions (1) and (2) are satisfied:

$$-0.5 < f_{2O}/f_{2I} < 1.0 \quad (1)$$

$$0.12 < d_{2O}/f_W < 0.35 \quad (2)$$

where $f_{2O}$ is a composite focal length of the object-side second lens unit, $f_{2I}$ is a composite focal length of the image-side second lens unit, $d_{2O}$ is an optical axial distance from a most object side lens surface of the object-side second lens unit to the aperture diaphragm, and $f_W$ is a focal length of the entire system at a wide-angle limit.

The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, wherein the zoom lens system, in order from an object side to an image side, comprises a first lens unit having negative optical power, a second lens unit having positive optical power, a third lens unit having negative optical power, and a fourth lens unit having positive optical power, in which the second lens unit is, in order from the object side to the image side, composed of an object-side second lens unit and an image-side second lens unit, the object-side second lens unit has positive optical power, an aperture diaphragm is located between the object-side second lens unit and the image-side second lens unit, and the following conditions (1) and (2) are satisfied:

$$-0.5 < f_{2O}/f_{2I} < 1.0 \quad (1)$$

$$0.12 < d_{2O}/f_W < 0.35 \quad (2)$$

where $f_{2O}$ is a composite focal length of the object-side second lens unit, $f_{2I}$ is a composite focal length of the image-side second lens unit, $d_{2O}$ is an optical axial distance from a most object side lens surface of the object-side second lens unit to the aperture diaphragm, and $f_W$ is a focal length of the entire system at a wide-angle limit.

The zoom lens system according to the present disclosure has short overall length of lens system and small outer diameter of lens system, as well as sufficiently compensated various aberrations and excellent optical performance, and is compact and lightweight.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
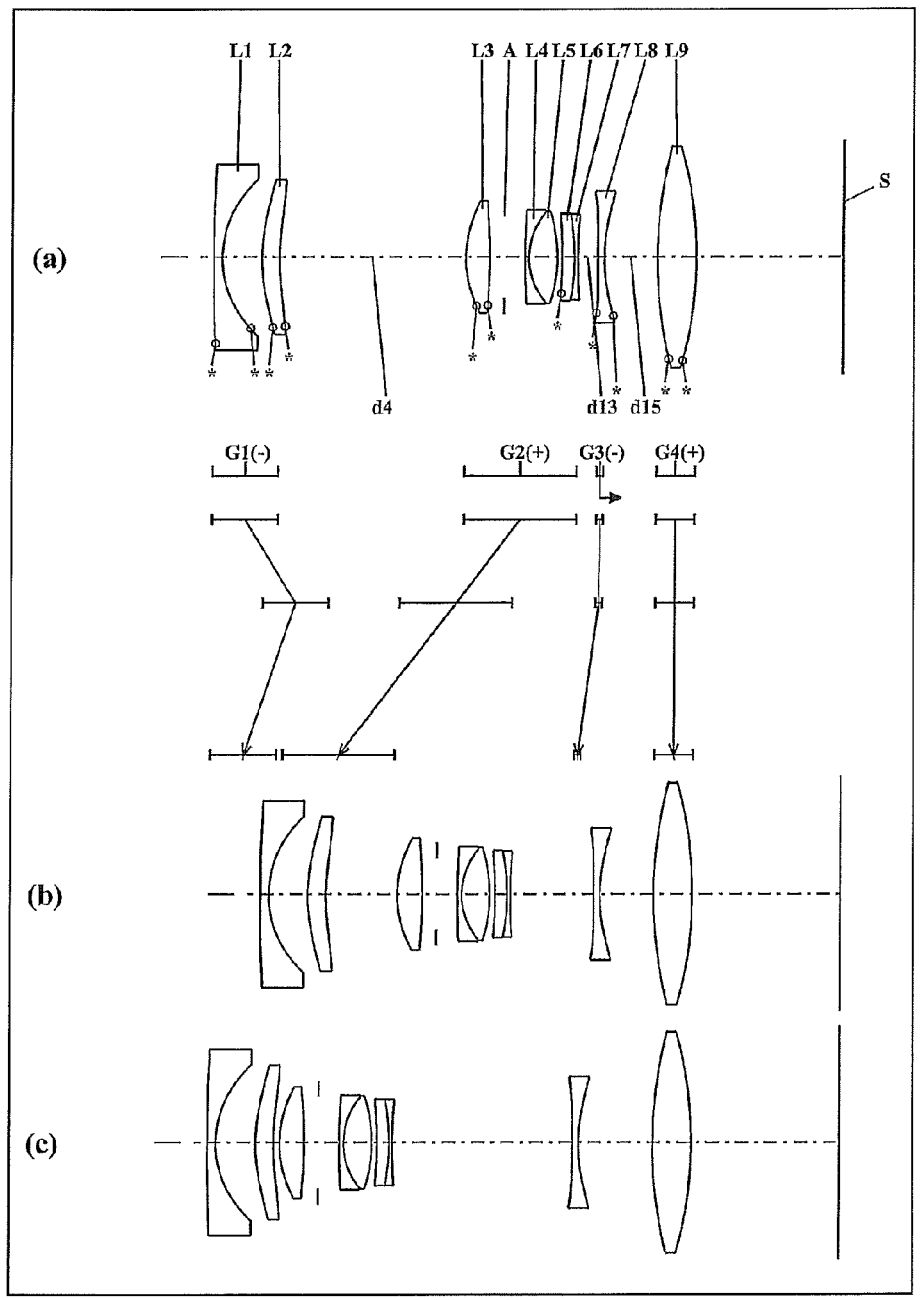
FIG. 1 is a lens arrangement diagram showing an infinity in-focus condition of a zoom lens system according to Embodiment 1 (Numerical Example 1)
Figure 2:
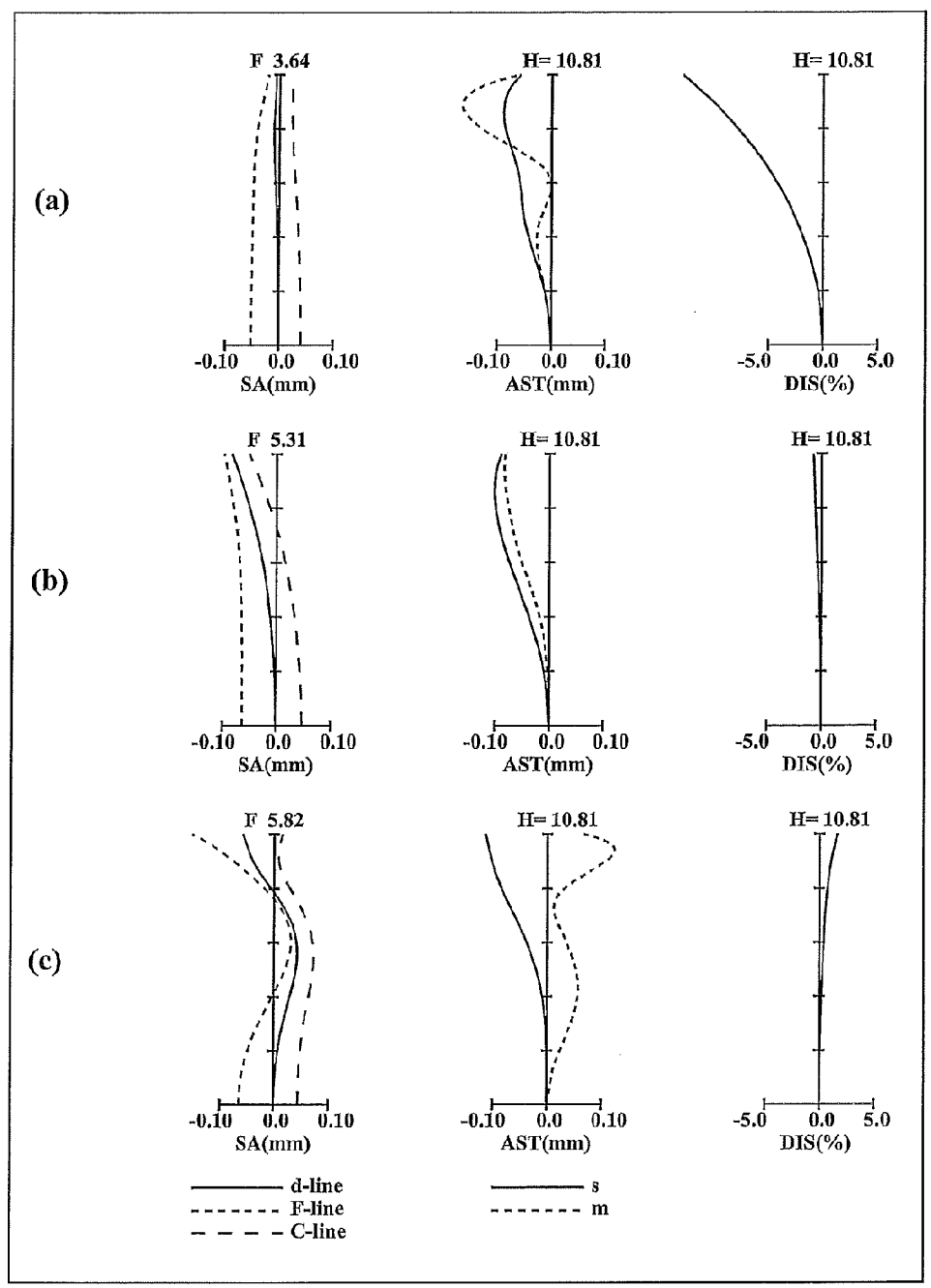
FIG. 2 is a longitudinal aberration diagram of an infinity in-focus condition of a zoom lens system according to Numerical Example 1.
Figure 3:
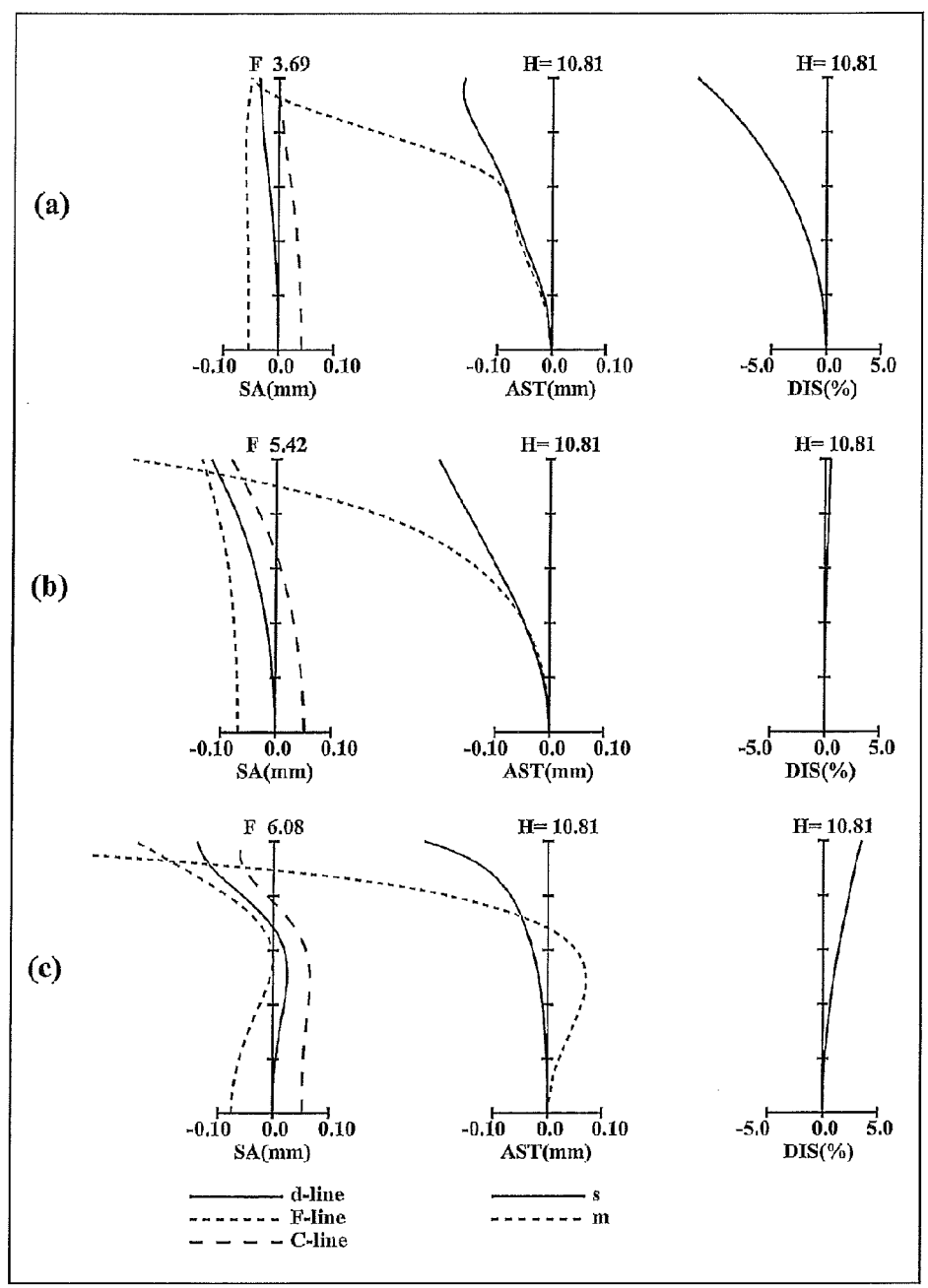
FIG. 3 is a longitudinal aberration diagram of a close-object in-focus condition of a zoom lens system according to Numerical Example 1.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

(Embodiments 1 to 4)

FIGS. 1, 5, 8, and 12 are lens arrangement diagrams of zoom lens systems according to Embodiments 1 to 4, respectively, and each of the zoom lens systems is in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit.

Moreover, in each Fig., an arrow imparted to a lens unit indicates focusing from an infinity in-focus condition to a close-object in-focus condition. That is, in FIGS. 1, 5, 8, and 12, the arrow indicates the moving direction of a third lens unit G3 described later, in focusing from an infinity in-focus condition to a close-object in-focus condition. In FIGS. 1, 5, 8, and 12, since the symbols of the respective lens units are imparted to part (a), the arrow indicating focusing is placed beneath each symbol of each lens unit for the convenience sake. However, the direction along which each lens unit moves in focusing in each zooming condition will be hereinafter described in detail for each embodiment.

Each of the zoom lens systems according to Embodiments 1 to 4, in order from the object side to the image side, comprises a first lens unit G1 having negative optical power, a second lens unit G2 having positive optical power, a third lens unit G3 having negative optical power, and a fourth lens unit G4 having positive optical power. In the zoom lens system according to each Embodiment, in zooming, the first lens unit G1, the second lens unit G2, and the third lens unit G3 individually move in the direction along the optical axis so that the intervals between the respective lens units, i.e., the interval between the first lens unit G1 and the second lens unit G2, the interval between the second lens unit G2 and the third lens unit G3, and the interval between the third lens unit G3 and the fourth lens unit G4, vary. In the zoom lens system according to each Embodiment, these lens units are arranged in a desired optical power configuration, thereby achieving size reduction of the entire lens system while maintaining high optical performance.

In FIGS. 1, 5, 8, and 12, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

Figure 5:
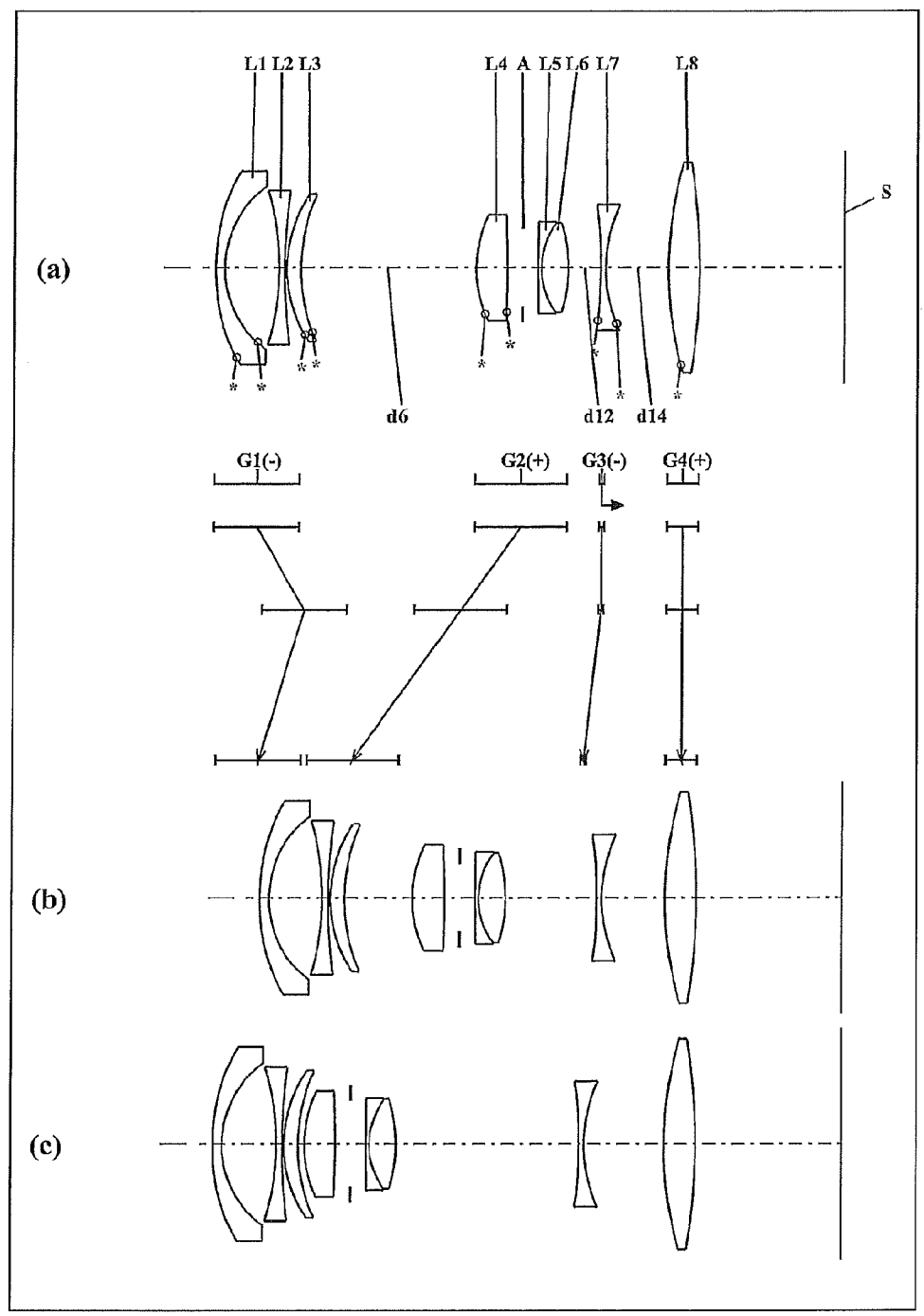
FIG. 5 is a lens arrangement diagram showing an infinity in-focus condition of a zoom lens system according to Embodiment 2 (Numerical Example 2)
Figure 6:
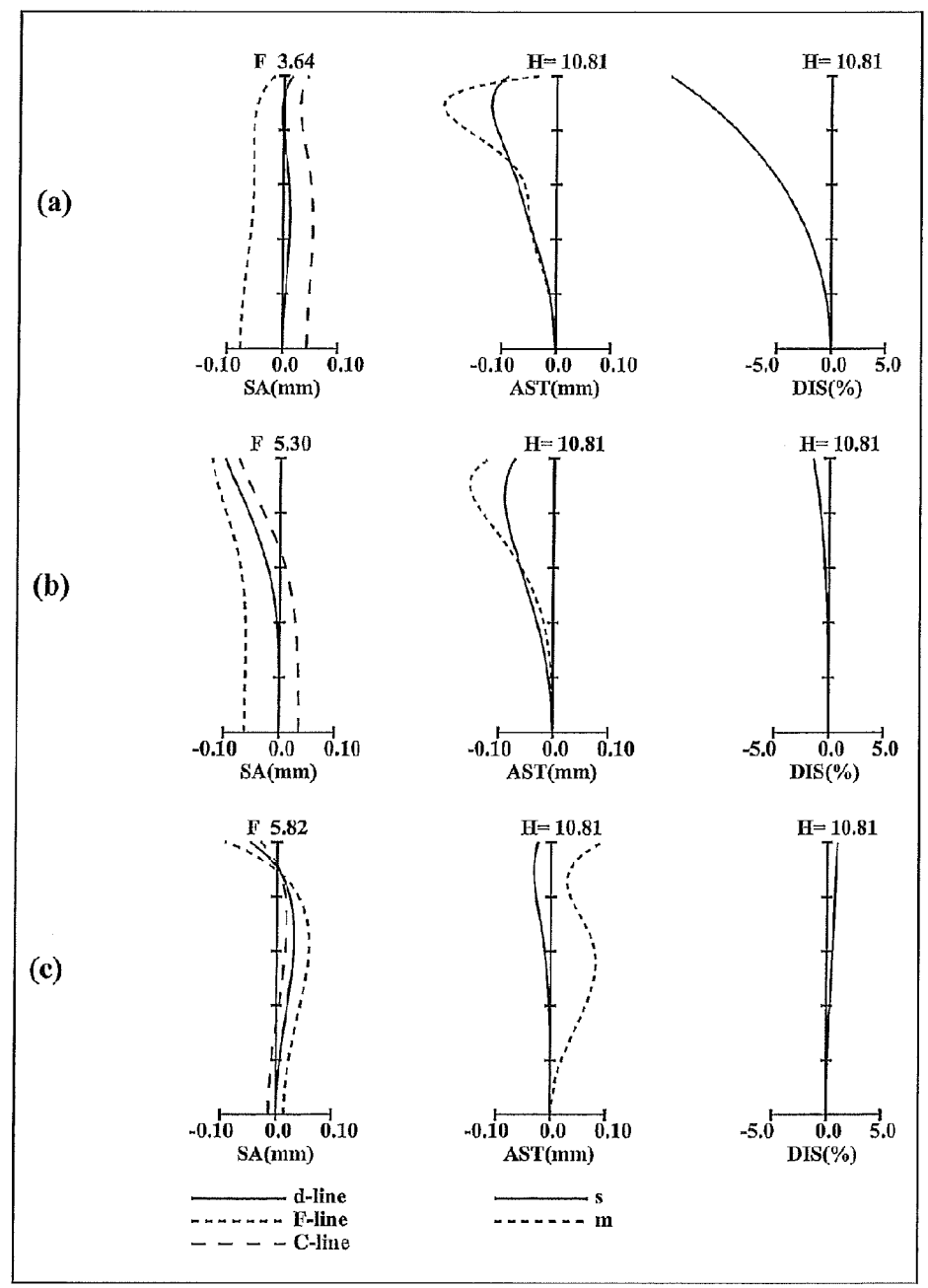
FIG. 6 is a longitudinal aberration diagram of an infinity in-focus condition of a zoom lens system according to Numerical Example 2.
Figure 7:
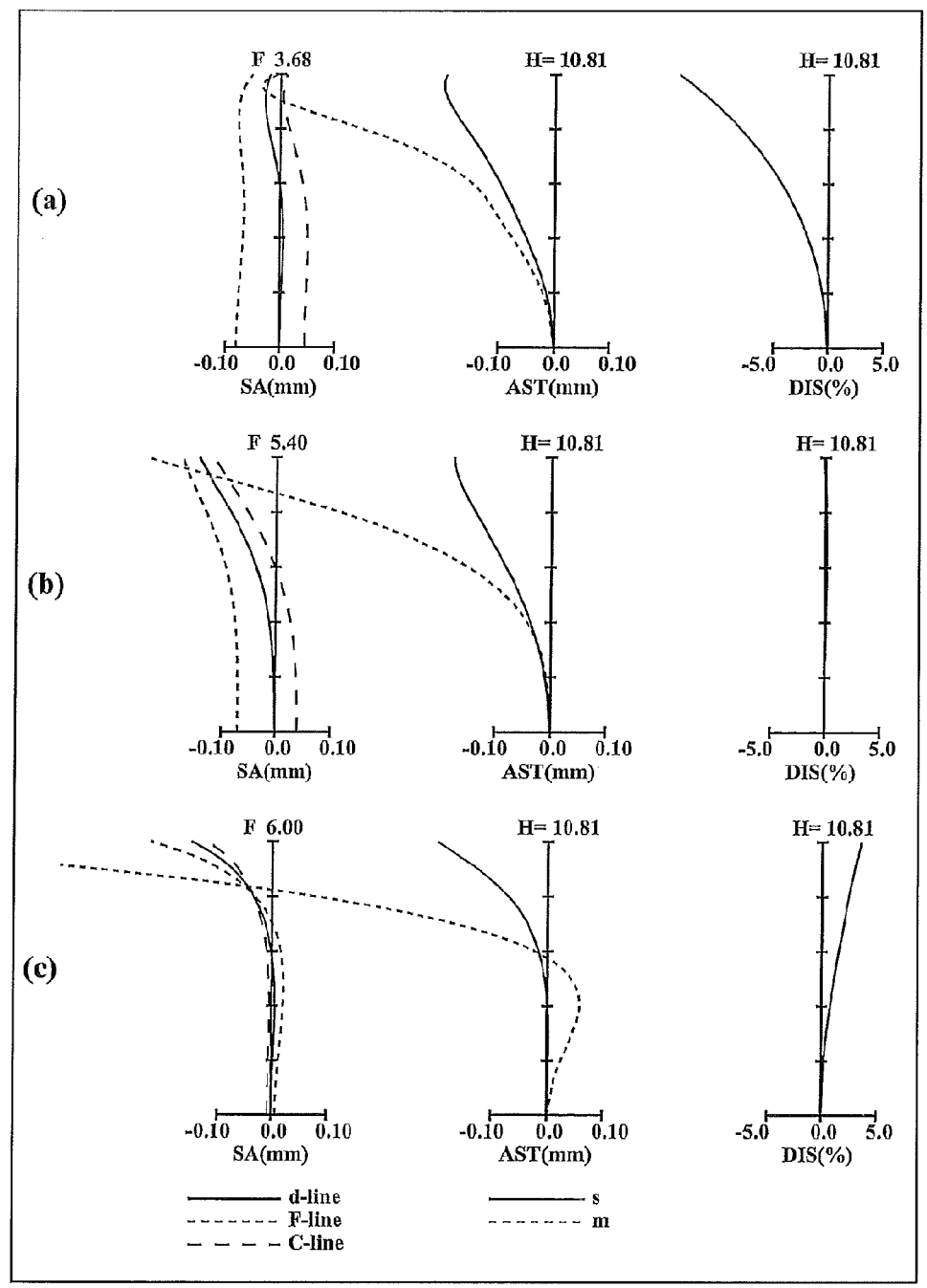
FIG. 7 is a longitudinal aberration diagram of a close-object in-focus condition of a zoom lens system according to Numerical Example 2.
Figure 8:
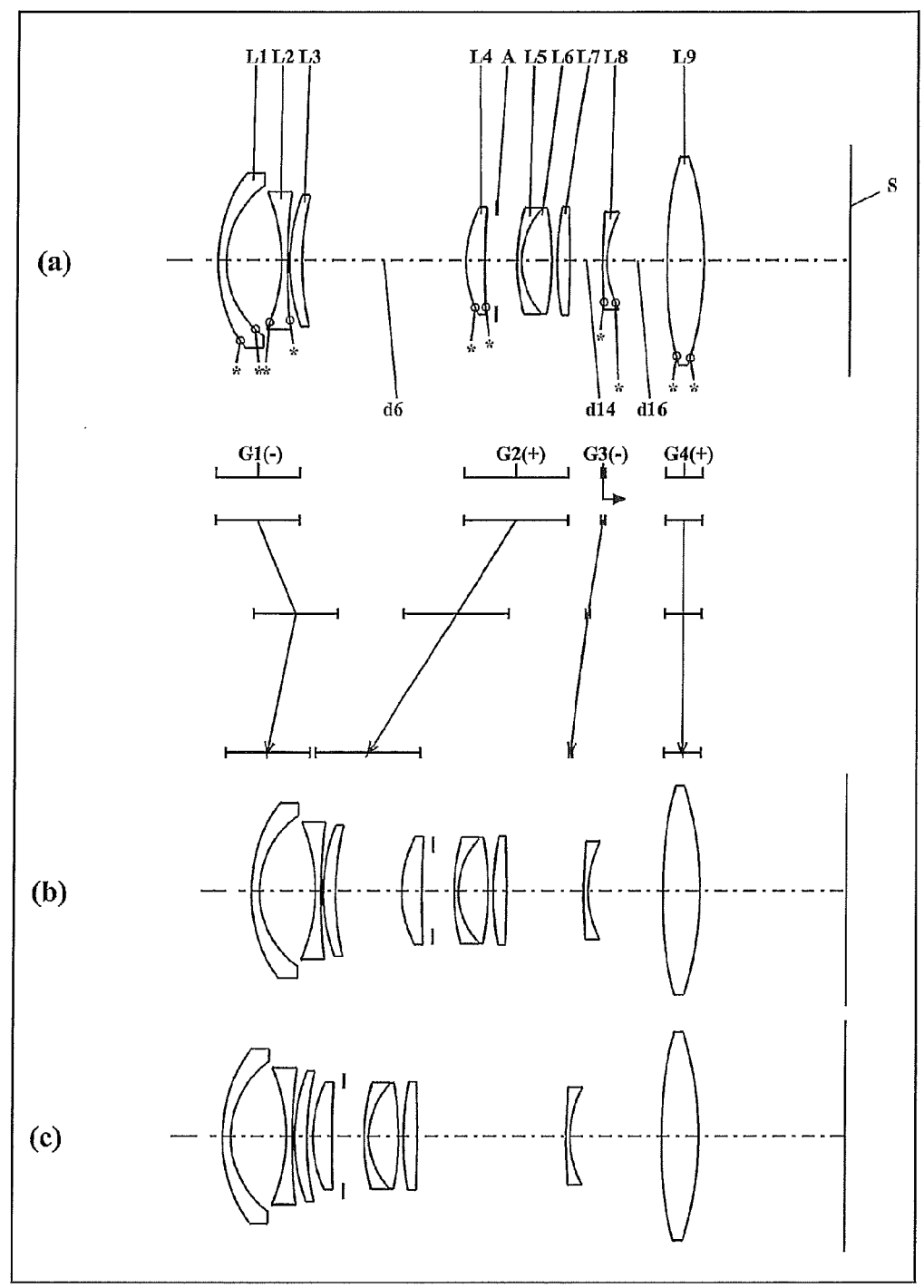
FIG. 8 is a lens arrangement diagram showing an infinity in-focus condition of a zoom lens system according to Embodiment 3 (Numerical Example 3)
Figure 9:
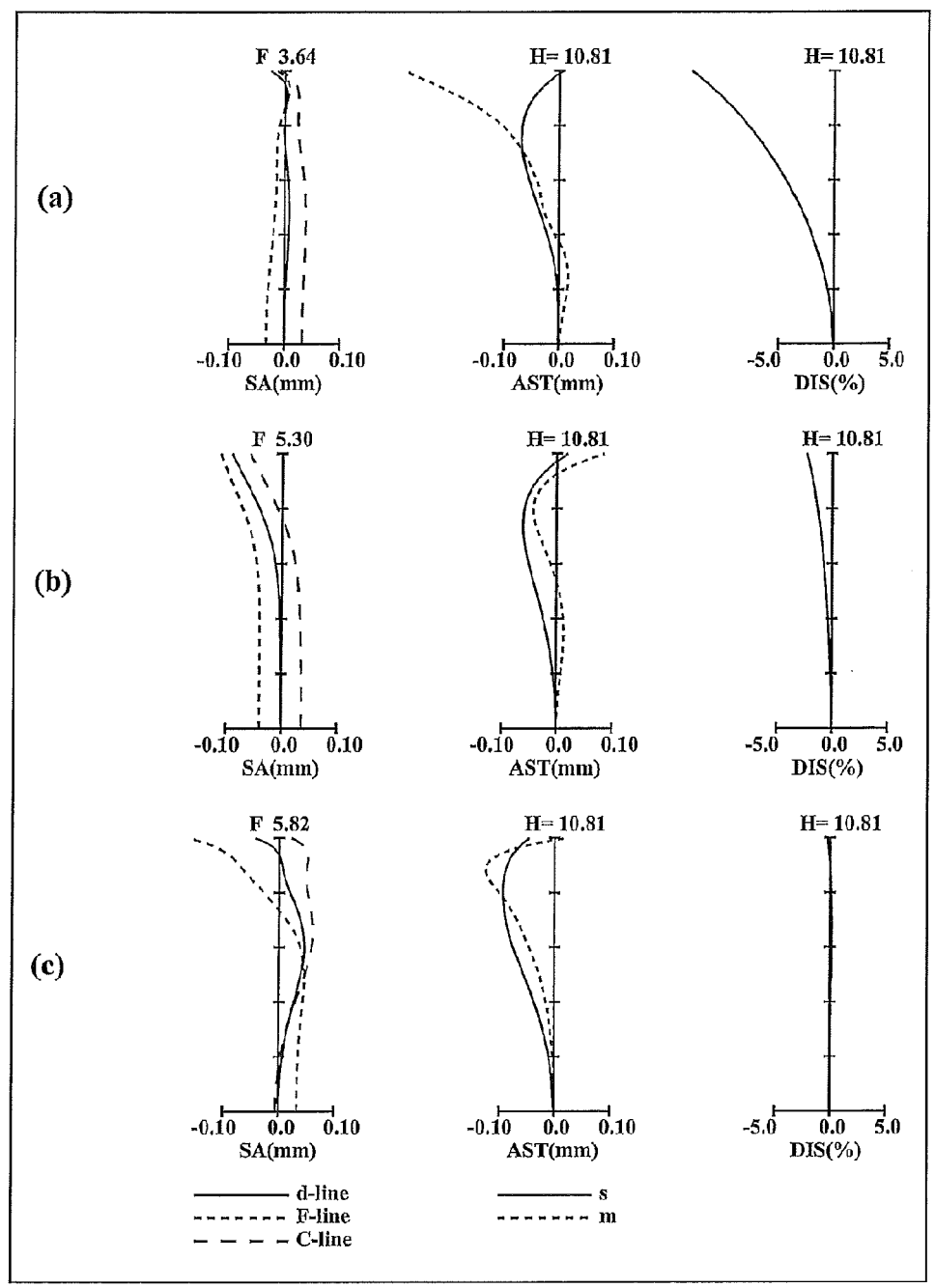
FIG. 9 is a longitudinal aberration diagram of an infinity in-focus condition of a zoom lens system according to Numerical Example 3.
Figure 10:
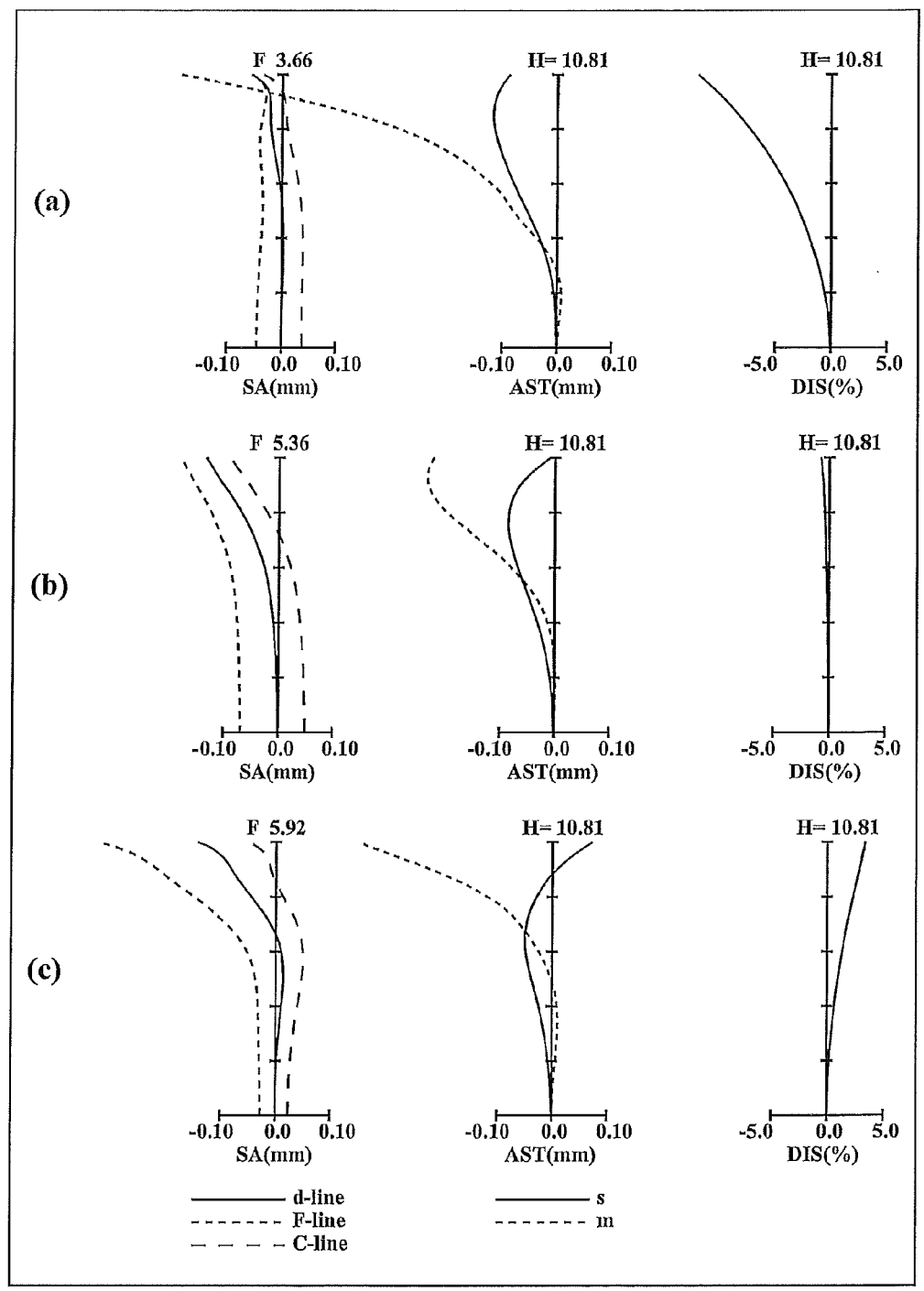
FIG. 10 is a longitudinal aberration diagram of a close-object in-focus condition of a zoom lens system according to Numerical Example 3.
Figure 12:
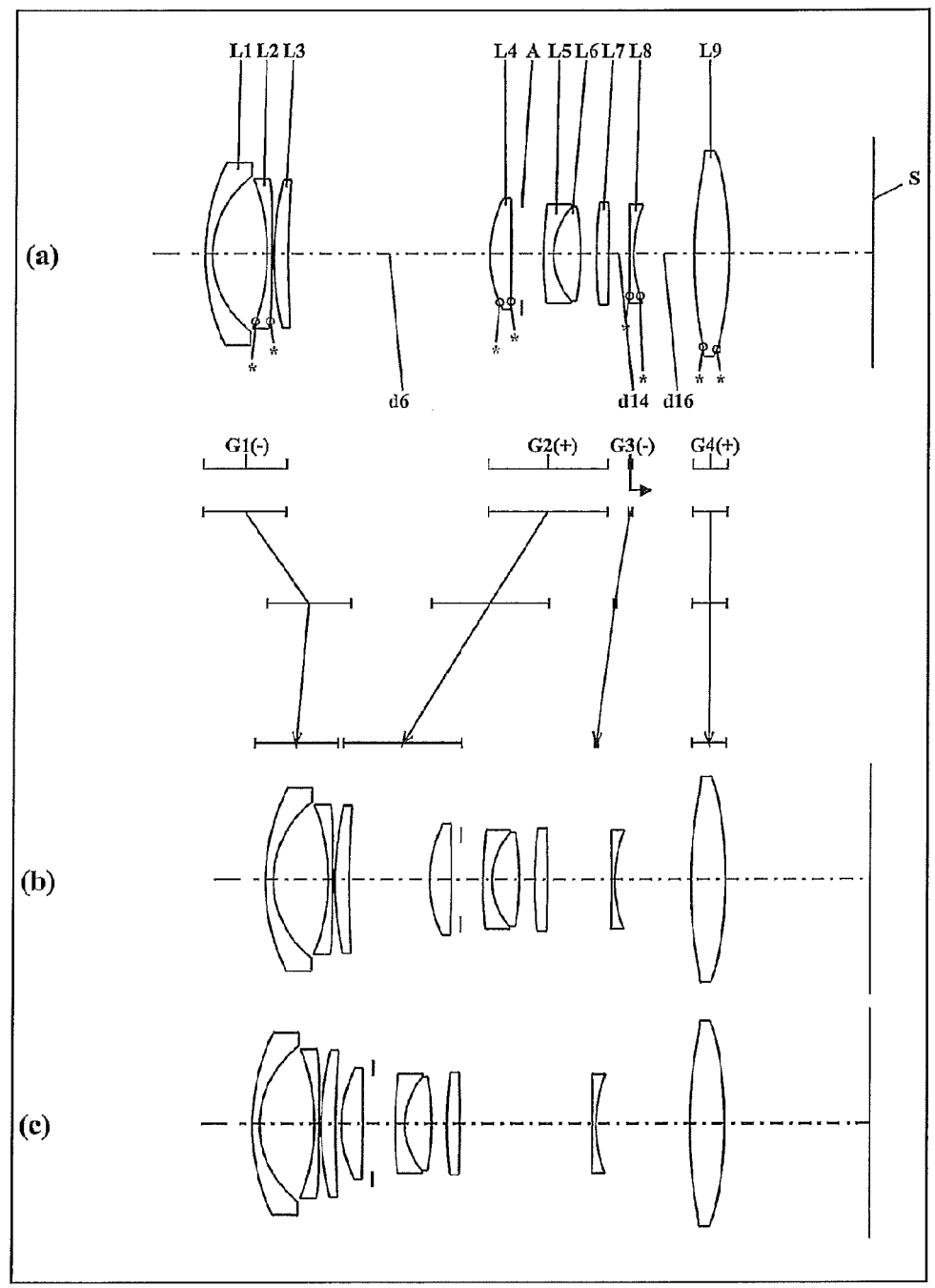
FIG. 12 is a lens arrangement diagram showing an infinity in-focus condition of a zoom lens system according to Embodiment 4 (Numerical Example 4)
Figure 13:
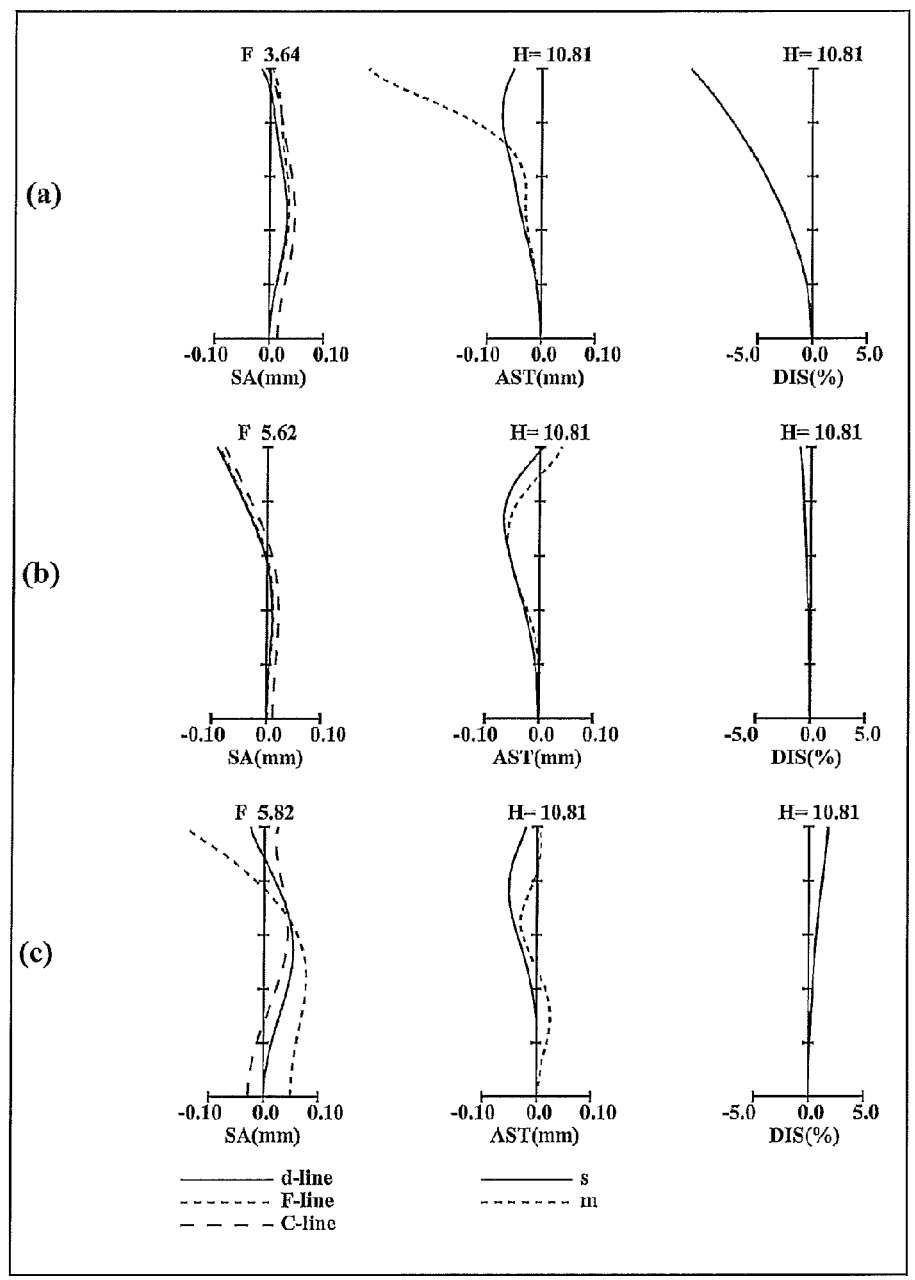
FIG. 13 is a longitudinal aberration diagram of an infinity in-focus condition of a zoom lens system according to Numerical Example 4.
Figure 14:
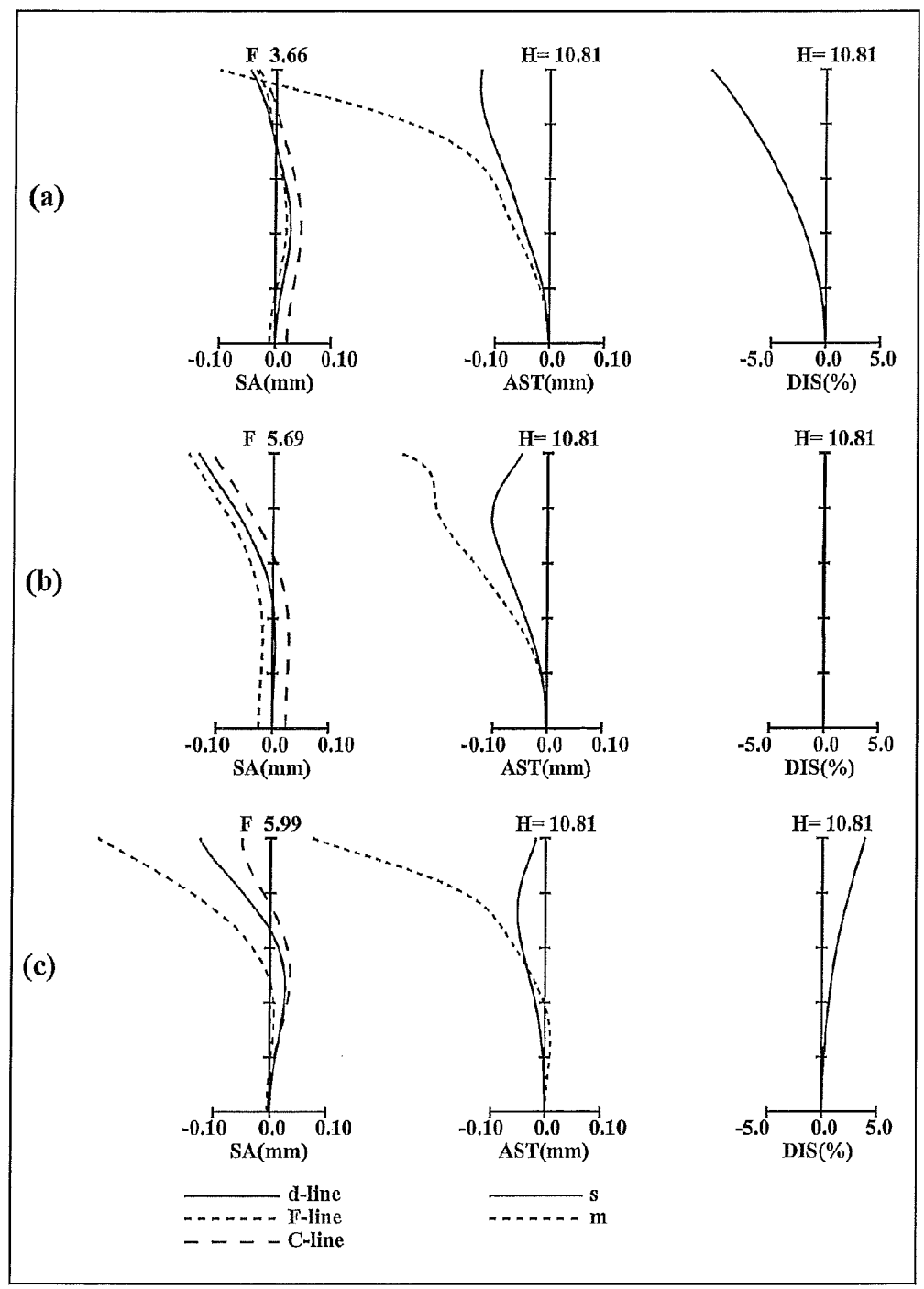
FIG. 14 is a longitudinal aberration diagram of a close-object in-focus condition of a zoom lens system according to Numerical Example 4.

Further, as shown in FIG. 1, an aperture diaphragm A is located between a third lens element L3 and a fourth lens element L4 in the second lens unit G2. As shown in FIGS. 5, 8, and 12, an aperture diaphragm A is located between a fourth lens element L4 and a fifth lens element L5 in the second lens unit G2. The location of each aperture diaphragm A will be hereinafter described in detail for each embodiment.

(Embodiment 1)

As shown in FIG. 1, the first lens unit G1, in order from the object side to the image side, comprises: a negative meniscus first lens element L1 with the convex surface facing the object side; and a positive meniscus second lens element L2 with the convex surface facing the object side. Each of the first lens element L1 and the second lens element L2 has two aspheric surfaces.

The second lens unit G2, in order from the object side to the image side, comprises: a bi-convex third lens element L3; a negative meniscus fourth lens element L4 with the convex surface facing the object side; a bi-convex fifth lens element L5; a positive meniscus sixth lens element L6 with the convex surface facing the image side; and a bi-concave seventh lens element L7. Among these, the fourth lens element L4 and the fifth lens element L5 are cemented with each other, and the sixth lens element L6 and the seventh lens element L7 are cemented with each other. The third lens element L3 has two aspheric surfaces, and the sixth lens element L6 has an aspheric object side surface.

The third lens element L3 which is a component of the second lens unit G2 corresponds to an object-side second lens unit described later. A cemented lens element composed of the fourth lens element L4 and the fifth lens element L5, and a cemented lens element composed of the sixth lens element L6 and the seventh lens element L7, which are components of the second lens unit G2, correspond to an image-side second lens unit described later. An aperture diaphragm A is located between the third lens element L3 and the fourth lens element L4, that is, between the object-side second lens unit and the image-side second lens unit.

The third lens unit G3 comprises solely a negative meniscus eighth lens element L8 with the convex surface facing the object side. The eighth lens element L8 has two aspheric surfaces.

The fourth lens unit G4 comprises solely a bi-convex ninth lens element L9. The ninth lens element L9 has two aspheric surfaces.

The cemented lens element composed of the sixth lens element L6 and the seventh lens element L7, which are components of the second lens unit G2, corresponds to an image blur compensating lens unit described later, which moves in a direction perpendicular to the optical axis in order to optically compensate image blur.

In zooming from a wide-angle limit to a telephoto limit at the time of image taking, the first lens unit G1 moves with locus of a convex to the image side, the second lens unit G2 monotonically moves to the object side, the third lens unit G3 monotonically and slightly moves to the object side, and the fourth lens unit G4 is fixed with respect to the image surface S. That is, in zooming, the first lens unit G1, the second lens unit G2, and the third lens unit G3 individually move along the optical axis such that the interval between the first lens unit G1 and the second lens unit G2 decreases, the interval between the second lens unit G2 and the third lens unit G3 increases, and the interval between the third lens unit G3 and the fourth lens unit G4 varies.

In focusing from an infinity in-focus condition to a close-object in-focus condition, the third lens unit G3 moves to the image side along the optical axis in any zooming condition.

(Embodiment 2)

As shown in FIG. 5, the first lens unit G1, in order from the object side to the image side, comprises: a negative meniscus first lens element L1 with the convex surface facing the object side; a bi-concave second lens element L2; and a positive meniscus third lens element L3 with the convex surface facing the object side. Among these, each of the first lens element L1 and the third lens element L3 has two aspheric surfaces.

The second lens unit G2, in order from the object side to the image side, comprises: a bi-convex fourth lens element L4; a negative meniscus fifth lens element L5 with the convex surface facing the object side; and a bi-convex sixth lens element L6. Among these, the fifth lens element L5 and the sixth lens element L6 are cemented with each other. The fourth lens element L4 has two aspheric surfaces.

The fourth lens element L4 which is a component of the second lens unit G2 corresponds to an object-side second lens unit described later. A cemented lens element composed of the fifth lens element L5 and the sixth lens element L6, which are components of the second lens unit G2, corresponds to an image-side second lens unit described later. An aperture diaphragm A is located between the fourth lens element L4 and the fifth lens element L5, that is, between the object-side second lens unit and the image-side second lens unit.

The third lens unit G3 comprises solely a bi-concave seventh lens element L7. The seventh lens element L7 has two aspheric surfaces.

The fourth lens unit G4 comprises solely a bi-convex eighth lens element L8. The eighth lens element L8 has an aspheric object side surface.

In zooming from a wide-angle limit to a telephoto limit at the time of image taking, the first lens unit G1 moves with locus of a convex to the image side, the second lens unit G2 monotonically moves to the object side, the third lens unit G3 monotonically and slightly moves to the object side, and the fourth lens unit G4 is fixed with respect to the image surface S. That is, in zooming, the first lens unit G1, the second lens unit G2, and the third lens unit G3 individually move along the optical axis such that the interval between the first lens unit G1 and the second lens unit G2 decreases, the interval between the second lens unit G2 and the third lens unit G3 increases, and the interval between the third lens unit G3 and the fourth lens unit G4 varies.

In focusing from an infinity in-focus condition to a close-object in-focus condition, the third lens unit G3 moves to the image side along the optical axis in any zooming condition.

(Embodiment 3)

As shown in FIG. 8, the first lens unit G1, in order from the object side to the image side, comprises: a negative meniscus first lens element L1 with the convex surface facing the object side; a bi-concave second lens element L2; and a positive meniscus third lens element L3 with the convex surface facing the object side. Among these, each of the first lens element L1 and the second lens element L2 has two aspheric surfaces.

The second lens unit G2, in order from the object side to the image side, comprises: a positive meniscus fourth lens element L4 with the convex surface facing the object side; a negative meniscus fifth lens element L5 with the convex surface facing the object side; a bi-convex sixth lens element L6; and a bi-convex seventh lens element L7. Among these, the fifth lens element L5 and the sixth lens element L6 are cemented with each other. The fourth lens element L4 has two aspheric surfaces.

The fourth lens element L4 which is a component of the second lens unit G2 corresponds to an object-side second lens unit described later. A cemented lens element composed of the fifth lens element L5 and the sixth lens element L6, and the seventh lens element L7, which are components of the second lens unit G2, correspond to an image-side second lens unit described later. An aperture diaphragm A is located between the fourth lens element L4 and the fifth lens element L5, that is, between the object-side second lens unit and the image-side second lens unit.

The third lens unit G3 comprises solely a negative meniscus eighth lens element L8 with the convex surface facing the object side. The eighth lens element L8 has two aspheric surfaces.

The fourth lens unit G4 comprises solely a bi-convex ninth lens element L9. The ninth lens element L9 has two aspheric surfaces.

The seventh lens element L7 which is a component of the second lens unit G2 corresponds to an image blur compensating lens unit described later, which moves in a direction perpendicular to the optical axis in order to optically compensate image blur.

In zooming from a wide-angle limit to a telephoto limit at the time of image taking, the first lens unit G1 moves with locus of a convex to the image side, the second lens unit G2 monotonically moves to the object side, the third lens unit G3 monotonically and slightly moves to the object side, and the fourth lens unit G4 is fixed with respect to the image surface S. That is, in zooming, the first lens unit G1, the second lens unit G2, and the third lens unit G3 individually move along the optical axis such that the interval between the first lens unit G1 and the second lens unit G2 decreases, the interval between the second lens unit G2 and the third lens unit G3 increases, and the interval between the third lens unit G3 and the fourth lens unit G4 varies.

In focusing from an infinity in-focus condition to a close-object in-focus condition, the third lens unit G3 moves to the image side along the optical axis in any zooming condition.

(Embodiment 4)

As shown in FIG. 12, the first lens unit G1, in order from the object side to the image side, comprises: a negative meniscus first lens element L1 with the convex surface facing the object side; a negative meniscus second lens element L2 with the convex surface facing the image side; and a positive meniscus third lens element L3 with the convex surface facing the object side. Among these, the second lens element L2 has two aspheric surfaces.

The second lens unit G2, in order from the object side to the image side, comprises: a bi-convex fourth lens element L4; a negative meniscus fifth lens element L5 with the convex surface facing the object side; a bi-convex sixth lens element L6; and a bi-convex seventh lens element L7. Among these, the fifth lens element L5 and the sixth lens element L6 are cemented with each other. The fourth lens element L4 has two aspheric surfaces.

The fourth lens element L4 which is a component of the second lens unit G2 corresponds to an object-side second lens unit described later. A cemented lens element composed of the fifth lens element L5 and the sixth lens element L6, and the seventh lens element L7, which are components of the second lens unit G2, correspond to an image-side second lens unit described later. An aperture diaphragm A is located between the fourth lens element L4 and the fifth lens element L5, that is, between the object-side second lens unit and the image-side second lens unit.

The third lens unit G3 comprises solely a bi-concave eighth lens element L8. The eighth lens element L8 has two aspheric surfaces.

The fourth lens unit G4 comprises solely a bi-convex ninth lens element L9. The ninth lens element L9 has two aspheric surfaces.

The seventh lens element L7 which is a component of the second lens unit G2 corresponds to an image blur compensating lens unit described later, which moves in a direction perpendicular to the optical axis in order to optically compensate image blur.

In zooming from a wide-angle limit to a telephoto limit at the time of image taking, the first lens unit G1 moves with locus of a convex to the image side, the second lens unit G2 monotonically moves to the object side, the third lens unit G3 monotonically and slightly moves to the object side, and the fourth lens unit G4 is fixed with respect to the image surface S. That is, in zooming, the first lens unit G1, the second lens unit G2, and the third lens unit G3 individually move along the optical axis such that the interval between the first lens unit G1 and the second lens unit G2 decreases, the interval between the second lens unit G2 and the third lens unit G3 increases, and the interval between the third lens unit G3 and the fourth lens unit G4 varies.

In focusing from an infinity in-focus condition to a close-object in-focus condition, the third lens unit G3 moves to the image side along the optical axis in any zooming condition.

The zoom lens systems according to Embodiments 1 to 4 each have a four-unit construction of negative, positive, negative, and positive, in which the second lens unit G2 is composed of two lens units of the object-side second lens unit and the image-side second lens unit, and the aperture diaphragm is located between the object-side second lens unit and the image-side second lens unit. Therefore, both of the interval between the first lens unit G1 and the second lens unit G2, and the interval between the second lens unit G2 and the third lens unit G3 can be reduced, thereby realizing a reduction in the overall length of lens system.

In the zoom lens systems according to Embodiments 1 to 4, the third lens unit G3 moves along the optical axis in focusing from an infinity in-focus condition to a close-object in-focus condition, and lens units each having positive optical power, that is, the second lens unit G2 and the fourth lens unit G4 are provided on each of the object side and the image side of the third lens unit G3. Therefore, the negative optical power of the third lens unit G3 itself can be easily increased. Accordingly, the amount of movement of the third lens unit G3 can be reduced in focusing, and thus the overall length of lens system is reduced, and moreover, the overall length of lens system with the lens barrel being retracted is also reduced.

In the zoom lens systems according to Embodiments 1 to 4, since the fourth lens unit G4 located closest to the image side is fixed with respect to the image surface in zooming from a wide-angle limit to a telephoto limit at the time of image taking, entry of dust or the like into the lens system is sufficiently prevented. Further, since the number of cam components is reduced, the configuration of the lens barrel can be simplified.

In the zoom lens systems according to Embodiments 1 to 4, since the first lens unit G1 located closest to the object side moves along the optical axis in zooming from a wide-angle limit to a telephoto limit at the time of image taking, the overall length of lens system is reduced, and moreover, the overall length of lens system with the lens barrel being retracted is also reduced.

The zoom lens systems according to Embodiments 1, 3, and 4 are each provided with an image blur compensating lens unit which moves in the direction perpendicular to the optical axis. The image blur compensating lens unit compensates image point movement caused by vibration of the entire system, that is, optically compensates image blur caused by hand blurring, vibration and the like.

When compensating image point movement caused by vibration of the entire system, the image blur compensating lens unit moves in the direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

The image blur compensating lens unit according to the present disclosure may be a single lens unit. When a single lens unit is composed of a plurality of lens elements, the image blur compensating lens unit may be any one lens element or a plurality of adjacent lens elements among the plurality of lens elements.

As described above, Embodiments 1 to 4 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that are beneficial to be satisfied by a zoom lens system like the zoom lens systems according to Embodiments 1 to 4. Here, a plurality of beneficial conditions is set forth for the zoom lens system according to each embodiment. A construction that satisfies all the plural conditions is most effective for the zoom lens system. However, when an individual condition is satisfied, a zoom lens system having the corresponding effect is obtained.

For example, in a zoom lens system like the zoom lens systems according to Embodiments 1 to 4, which comprises, in order from an object side to an image side, a first lens unit having negative optical power, a second lens unit having positive optical power, a third lens unit having negative optical power, and a fourth lens unit having positive optical power, and in which the second lens unit is, in order from the object side to the image side, composed of an object-side second lens unit and an image-side second lens unit, in which the object-side second lens unit has positive optical power, and in which an aperture diaphragm is located between the object-side second lens unit and the image-side second lens unit (this lens configuration is referred to as a basic configuration of the embodiments, hereinafter), the following conditions (1) and (2) are satisfied.

$$-0.5 < f_{2O}/f_{2I} < 1.0 \tag{1}$$

$$0.12 < d_{2O}/f_W < 0.35 \tag{2}$$

where $f_{2O}$ is a composite focal length of the object-side second lens unit, $f_{2I}$ is a composite focal length of the image-side second lens unit, $d_{2O}$ is an optical axial distance from a most object side lens surface of the object-side second lens unit to the aperture diaphragm, and $f_W$ is a focal length of the entire system at a wide-angle limit.

The condition (1) sets forth the relationship between the focal length of the object-side second lens unit and the focal length of the image-side second lens unit. When the value goes below the lower limit of the condition (1), the negative optical power of the image-side second lens unit becomes strong, and thereby the whole optical power of the second lens unit cannot be enhanced. When the value exceeds the upper limit of the condition (1), the optical power of the object-side second lens unit becomes weak, and thereby a principal plane of the second lens unit is positioned nearer the image side thereof. As a result, it becomes difficult to compensate aberrations at a telephoto limit.

When at least one of the following conditions (1)' and (1)" is satisfied, the above-mentioned effect is achieved more successfully.

$$-0.3 < f_{2O}/f_{2I} \tag{1}'$$

$$f_{2O}/f_{2I} < 0.7 \tag{1}''$$

The condition (2) sets forth the relationship between the distance from a most object side lens surface of the object-side second lens unit to the aperture diaphragm, and the focal length of the entire system at a wide-angle limit. That is, the condition (2) relates to the location of the aperture diaphragm. When the value goes below the lower limit of the condition (2), the diameter of the first lens unit becomes large, and thereby the outer diameter of lens system cannot be reduced. When the value exceeds the upper limit of the condition (2), upper light which passes through the upper part of each lens element at a wide-angle limit cannot be cut, and thereby it becomes difficult to compensate aberrations at a wide-angle limit.

When at least one of the following conditions (2)' and (2)" is satisfied, the above-mentioned effect is achieved more successfully.

$$0.18 < d_{2O}/f_W \tag{2}'$$

$$d_{2O}/f_W < 0.33 \tag{2}''$$

It is beneficial that a zoom lens system having the basic configuration like the zoom lens systems according to Embodiments 1 to 4 satisfies the following condition (3).

$$0.5 < f_{2O}/f_W < 3.0 \qquad (3)$$

where $f_{2O}$ is a composite focal length of the object-side second lens unit, and $f_W$ is a focal length of the entire system at a wide-angle limit.

The condition (3) sets forth the relationship between the focal length of the object-side second lens unit and the focal length of the entire system at a wide-angle limit. When the value goes below the lower limit of the condition (3), aberrations due to decentering of the object-side second lens unit might become excessively large. When the value exceeds the upper limit of the condition (3), a principal plane of the object-side second lens unit is positioned nearer the image side thereof, and thereby it becomes difficult to compensate aberrations at a telephoto limit.

When at least one of the following conditions (3)' and (3)" is satisfied, the above-mentioned effect is achieved more successfully.

$$0.8 < f_{2O}/f_W \qquad (3)'$$

$$f_{2O}/f_W < 2.0 \qquad (3)''$$

It is beneficial that a zoom lens system having the basic configuration like the zoom lens systems according to Embodiments 1 to 4 satisfies the following condition (4).

$$0.30 < d_1/f_W < 0.85 \qquad (4)$$

where $d_1$ is an optical axial thickness of the first lens unit, and $f_W$ is a focal length of the entire system at a wide-angle limit.

The condition (4) sets forth the relationship between the thickness of the first lens unit and the focal length of the entire system at a wide-angle limit. When the value goes below the lower limit of the condition (4), the optical power of each lens element constituting the first lens unit cannot be increased, which might cause difficulty in reduction of the overall length of lens system. When the value exceeds the upper limit of the condition (4), the overall length of lens system increases, which might cause increase also in the overall length of lens system with the lens barrel being retracted.

When at least one of the following conditions (4)' and (4)" is satisfied, the above-mentioned effect is achieved more successfully.

$$0.4 < d_1/f_W \qquad (4)'$$

$$d_1/f_W < 0.7 \qquad (4)''$$

The individual lens units constituting the zoom lens systems according to Embodiments 1 to 4 are each composed exclusively of refractive type lens elements that deflect incident light by refraction (that is, lens elements of a type in which deflection is achieved at the interface between media having different refractive indices). However, the present invention is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

(Embodiment 5)

Figure 16:
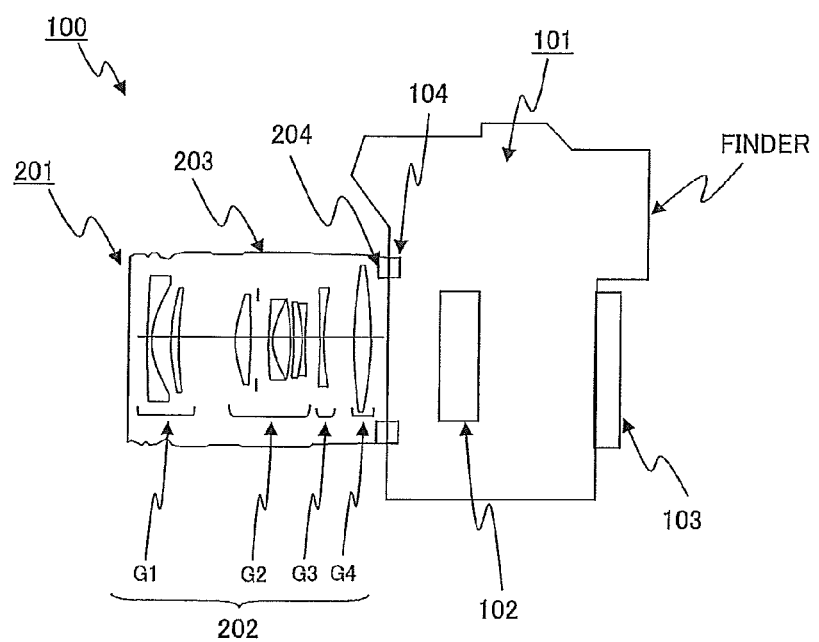
FIG. 16 is a schematic construction diagram of an interchangeable-lens type digital camera system according to Embodiment 5.

FIG. 16 is a schematic construction diagram of an interchangeable-lens type digital camera system according to Embodiment 5.

The interchangeable-lens type digital camera system 100 according to Embodiment 5 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 4; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 16, the zoom lens system according to Embodiment 1 is employed as the zoom lens system 202.

In Embodiment 5, since the zoom lens system 202 according to any of Embodiments 1 to 4 is employed, a compact interchangeable lens apparatus having excellent imaging performance can be realized at low cost. Moreover, size reduction and cost reduction of the entire camera system 100 according to Embodiment 5 can be achieved. In the zoom lens systems according to Embodiments 1 to 4, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 4.

As described above, Embodiment 5 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 4 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and An is a n-th order aspherical coefficient.

FIGS. 2, 6, 9, and 13 are longitudinal aberration diagrams of an infinity in-focus condition of the zoom lens systems according to Numerical Examples 1 to 4, respectively.

FIGS. 3, 7, 10, and 14 are longitudinal aberration diagrams of a close-object in-focus condition of the zoom lens systems according to Numerical Examples 1 to 4, respectively. The object distance in each of Numerical Examples 1 to 4 is 300 mm.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

Figure 4:
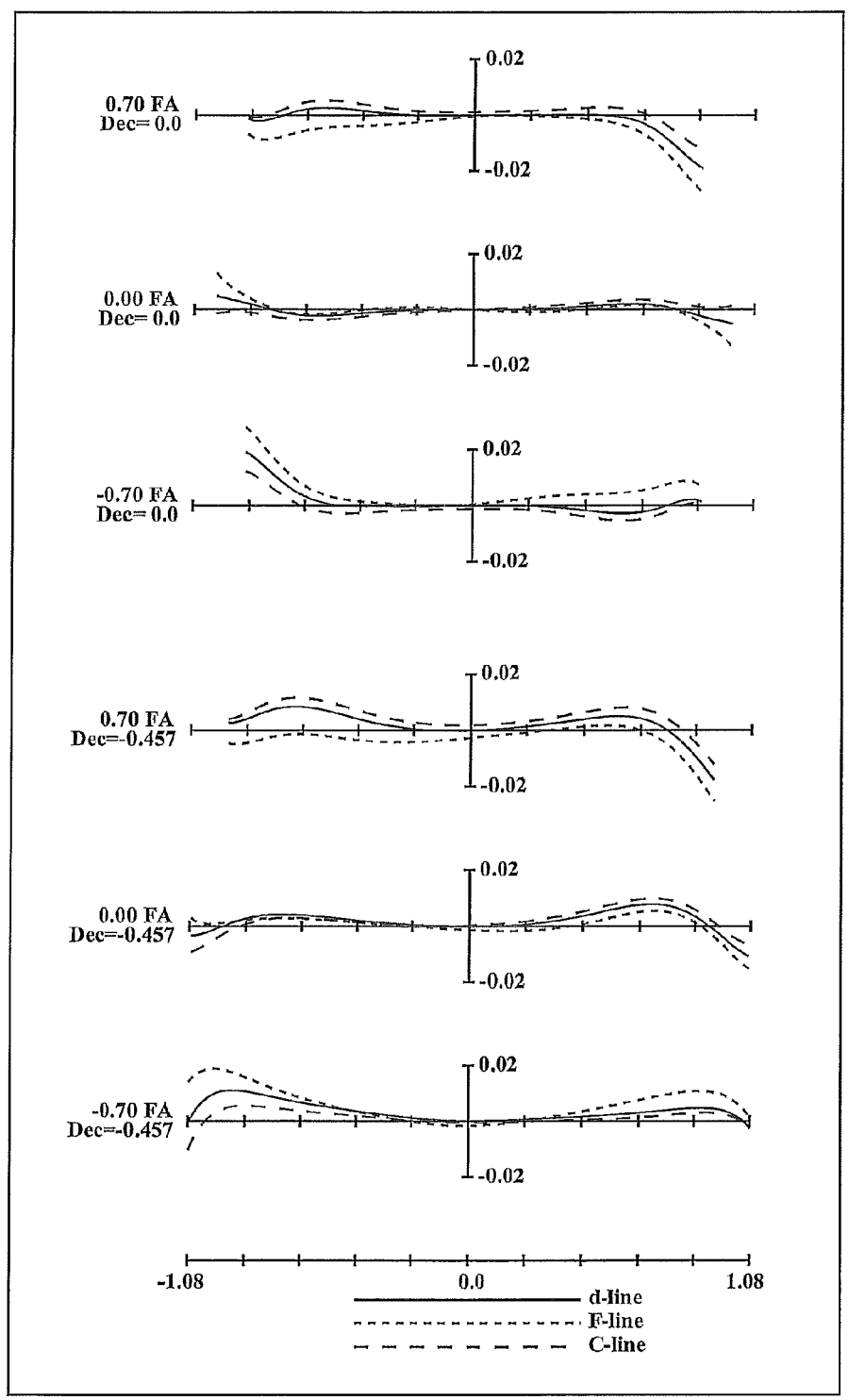
FIG. 4 is a lateral aberration diagram of a zoom lens system according to Numerical Example 1 at a telephoto limit in a basic state where image blur compensation is not performed and in an image blur compensation state.
Figure 11:
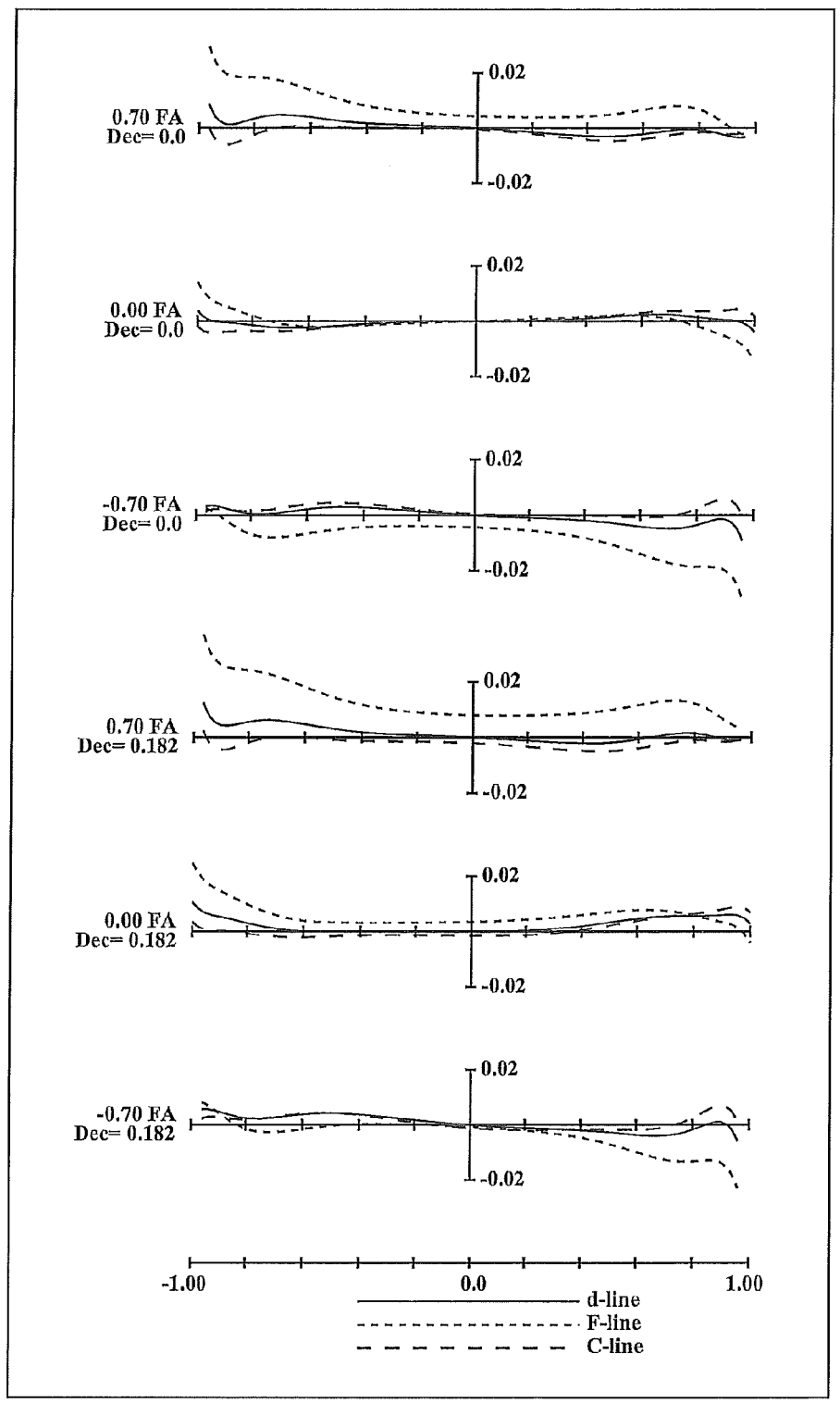
FIG. 11 is a lateral aberration diagram of a zoom lens system according to Numerical Example 3 at a telephoto limit in a basic state where image blur compensation is not performed and in an image blur compensation state.
Figure 15:
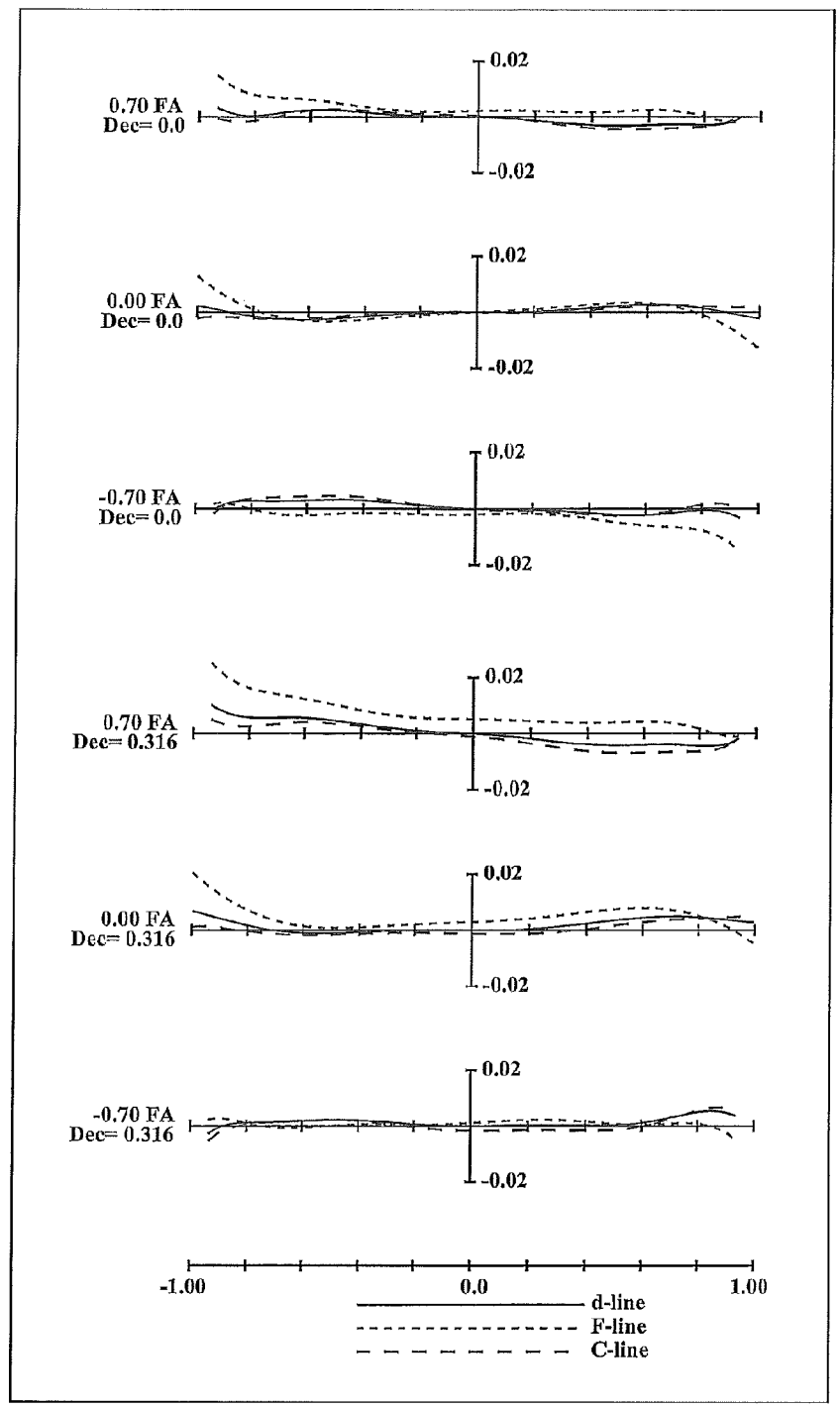
FIG. 15 is a lateral aberration diagram of a zoom lens system according to Numerical Example 4 at a telephoto limit in a basic state where image blur compensation is not performed and in an image blur compensation state.

FIGS. 4, 11, and 15 are lateral aberration diagrams of the zoom lens systems at a telephoto limit according to Numerical Examples 1, 3, and 4, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (Numerical Example 1: the cemented lens element composed of the sixth lens element L6 and the seventh lens element L7, Numerical Examples 3 and 4: the seventh lens element L7) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the second lens unit G2.

In the zoom lens system according to each Numerical Example, the amount of movement of the image blur compensating lens unit in a direction perpendicular to the optical axis in an image blur compensation state at a telephoto limit is as follows.

| Numerical Example | Amount of movement (mm) |
|---|---|
| 1 | 0.457 |
| 3 | 0.182 |
| 4 | 0.316 |

When the shooting distance is infinity, at a telephoto limit, the amount of image decentering in a case that the zoom lens system inclines by 0.3° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data in an infinity in-focus condition. Table 4 shows various data in a close-object in-focus condition.

TABLE 1

(Surface data)

| Surface number | r | d | nd | vd |
|---|---|---|---|---|
| Object surface | ∞ | | | |
| 1* | 7246.07820 | 0.80000 | 1.77200 | 50.0 |
| 2* | 9.76630 | 3.77470 | | |
| 3* | 15.61040 | 1.75130 | 2.00170 | 20.6 |
| 4* | 23.59990 | Variable | | |
| 5* | 10.99500 | 2.32880 | 1.69385 | 53.1 |
| 6* | −46.84230 | 1.39640 | | |
| 7 (Diaphragm) | ∞ | 2.00000 | | |
| 8 | 81.47730 | 0.40000 | 1.85026 | 32.3 |
| 9 | 6.78960 | 2.72250 | 1.49700 | 81.6 |
| 10 | −14.43410 | 0.50000 | | |
| 11* | −52.86350 | 1.18010 | 1.81000 | 41.0 |
| 12 | −21.55830 | 0.30000 | 1.48749 | 70.4 |
| 13 | 46.44870 | Variable | | |
| 14* | 1000.00000 | 0.60000 | 1.77200 | 50.0 |
| 15* | 15.45450 | Variable | | |

TABLE 1-continued (Surface data)

| Surface number | r | d | nd | vd |
|---|---|---|---|---|
| 16* | 38.47910 | 3.71710 | 1.85400 | 40.4 |
| 17* | −48.71800 | (BF) | | |
| Image surface | ∞ | | | |

TABLE 2

(Aspherical data)

Surface No. 1

K = 0.00000E+00, A4 = 1.06900E−04, A6 = −1.23164E−06,
A8 = 3.36463E−09 A10 = 8.54528E−13
Surface No. 2

K = 0.00000E+00, A4 = −5.29613E−05, A6 = 1.38564E−06,
A8 = −2.42278E−08 A10 = −9.75451E−11
Surface No. 3

K = 0.00000E+00, A4 = −2.71820E−04, A6 = 1.40876E−06,
A8 = 0.00000E+00 A10 = 0.00000E+00
Surface No. 4

K = 0.00000E+00, A4 = −2.56009E−04, A6 = 1.00320E−06,
A8 = 0.00000E+00 A10 = 0.00000E+00
Surface No. 5

K = 0.00000E+00, A4 = −6.09544E−05, A6 = −5.78175E−08,
A8 = 0.00000E+00 A10 = 0.00000E+00
Surface No. 6

K = 0.00000E+00, A4 = 7.98019E−05, A6 = −3.37082E−07,
A8 = 1.48113E−08 A10 = −2.44475E−10
Surface No. 11

K = 0.00000E+00, A4 = −1.28683E−05, A6 = −7.75752E−07,
A8 = 1.15009E−07 A10 = −3.34531E−09
Surface No. 14

K = 0.00000E+00, A4 = −1.94531E−04, A6 = 2.03325E−08,
A8 = 0.00000E+00 A10 = 0.00000E+00
Surface No. 15

K = 0.00000E+00, A4 = −1.89186E−04, A6 = 6.83816E−08,
A8 = 0.00000E+00 A10 = 0.00000E+00
Surface No. 16

K = 0.00000E+00, A4 = −2.43333E−05, A6 = 2.10209E−07,
A8 = −1.20236E−09 A10 = 3.61521E−12
Surface No. 17

K = 0.00000E+00, A4 = −3.55533E−05, A6 = 1.46031E−07,
A8 = 0.00000E+00 A10 = 0.00000E+00

TABLE 3

(Various data in an infinity in-focus condition)

Zooming ratio 2.79710

| | Wide-angle limit | Middle position | Telephoto limit |
|---|---|---|---|
| Focal length | 14.4901 | 24.2340 | 40.5304 |
| F-number | 3.64054 | 5.30513 | 5.82425 |
| View angle | 40.5973 | 24.2052 | 14.7083 |
| Image height | 10.8150 | 10.8150 | 10.8150 |
| Overall length of lens system | 60.5693 | 55.6705 | 60.5698 |

TABLE 3-continued (Various data in an infinity in-focus condition)

| | | | |
|---|---|---|---|
| BF | 14.1990 | 14.1990 | 14.1990 |
| d4 | 17.8853 | 6.8869 | 0.6000 |
| d13 | 1.9392 | 8.0113 | 17.2462 |
| d15 | 5.0745 | 5.1018 | 7.0529 |

Zoom lens unit data

| Lens unit | Initial surface No. | Focal length |
|---|---|---|
| 1 | 1 | −19.77079 |
| 2 | 5 | 15.73323 |
| 3 | 14 | −20.33850 |
| 4 | 16 | 25.67835 |

TABLE 4

(Various data in a close-object in-focus condition)

| | Wide-angle limit | Middle position | Telephoto limit |
|---|---|---|---|
| Object distance | 300.0000 | 300.0000 | 300.0000 |
| BF | 14.1990 | 14.1990 | 14.1990 |
| d4 | 17.8853 | 6.8869 | 0.6000 |
| d13 | 2.4100 | 9.3719 | 21.0126 |
| d15 | 4.6037 | 3.7412 | 3.2864 |

NUMERICAL EXAMPLE 2

The zoom lens system of Numerical Example 2 corresponds to Embodiment 2 shown in FIG. 5. Table 5 shows the surface data of the zoom lens system of Numerical Example 2. Table 6 shows the aspherical data. Table 7 shows various data in an infinity in-focus condition. Table 8 shows various data in a close-object in-focus condition.

TABLE 5

(Surface data)

| Surface number | r | d | nd | vd |
|---|---|---|---|---|
| Object surface | ∞ | | | |
| 1* | 24.26410 | 0.90000 | 1.81000 | 41.0 |
| 2* | 10.38930 | 5.28250 | | |
| 3 | −26.13930 | 0.60000 | 1.61800 | 63.4 |
| 4 | 55.82340 | 0.20000 | | |
| 5* | 12.45890 | 1.36570 | 2.01960 | 21.5 |
| 6* | 17.93070 | Variable | | |
| 7* | 11.91240 | 3.08090 | 1.77200 | 50.0 |
| 8* | −72.97730 | 1.50000 | | |
| 9 (Diaphragm) | ∞ | 1.50000 | | |
| 10 | 578.36700 | 0.30000 | 1.80610 | 33.3 |
| 11 | 7.32500 | 2.64380 | 1.49700 | 81.6 |
| 12 | −14.76640 | Variable | | |
| 13* | −93.84910 | 0.50000 | 1.54000 | 56.0 |
| 14* | 13.12940 | Variable | | |
| 15* | 40.68890 | 3.06480 | 1.85400 | 40.4 |
| 16 | −64.48970 | (BF) | | |
| Image surface | ∞ | | | |

TABLE 6

(Aspherical data)

Surface No. 1

K = 0.00000E+00, A4 = 7.20660E−05, A6 = −1.76669E−07,
A8 = 0.00000E+00 A10 = 0.00000E+00
Surface No. 2

K = 0.00000E+00, A4 = 2.37301E−05, A6 = 4.41999E−07,
A8 = 0.00000E+00 A10 = 0.00000E+00
Surface No. 5

K = 0.00000E+00, A4 = −1.43956E−04, A6 = 1.78509E−06,
A8 = 0.00000E+00 A10 = 0.00000E+00
Surface No. 6

K = 0.00000E+00, A4 = −7.82448E−05, A6 = 1.98131E−06,
A8 = 0.00000E+00 A10 = 0.00000E+00
Surface No. 7

K = 0.00000E+00, A4 = −2.77853E−05, A6 = 3.01868E−07,
A8 = 0.00000E+00 A10 = 0.00000E+00
Surface No. 8

K = 0.00000E+00, A4 = 9.37123E−05, A6 = −1.02967E−07,
A8 = 8.87091E−09 A10 = −6.74560E−11
Surface No. 13

K = 0.00000E+00, A4 = −1.64682E−04, A6 = 6.28293E−07,
A8 = 0.00000E+00 A10 = 0.00000E+00
Surface No. 14

K = 0.00000E+00, A4 = −1.42056E−04, A6 = −1.38794E−07,
A8 = 0.00000E+00 A10 = 0.00000E+00
Surface No. 15

K = 0.00000E+00, A4 = 1.88815E−05, A6 = −5.91514E−08,
A8 = 0.00000E+00 A10 = 0.00000E+00

TABLE 7

(Various data in an infinity in-focus condition)

Zooming ratio 2.79710

| | Wide-angle limit | Middle position | Telephoto limit |
|---|---|---|---|
| Focal length | 14.4901 | 24.2340 | 40.5302 |
| F-number | 3.64081 | 5.30486 | 5.82421 |
| View angle | 41.1705 | 24.3636 | 14.8033 |
| Image height | 10.8150 | 10.8150 | 10.8150 |
| Overall length of lens system | 61.5691 | 56.8414 | 61.2610 |
| BF | 14.1990 | 14.1990 | 14.1990 |
| d6 | 17.1452 | 6.6315 | 0.6000 |
| d12 | 3.1505 | 8.9183 | 17.7188 |
| d14 | 6.1365 | 6.1547 | 7.8054 |

Zoom lens unit data

| Lens unit | Initial surface No. | Focal length |
|---|---|---|
| 1 | 1 | −18.64438 |
| 2 | 7 | 14.98819 |
| 3 | 13 | −21.29480 |
| 4 | 15 | 29.61077 |

TABLE 8

(Various data in a close-object in-focus condition)

| | Wide-angle limit | Middle position | Telephoto limit |
|---|---|---|---|
| Object distance | 300.0000 | 300.0000 | 300.0000 |
| BF | 14.1990 | 14.1990 | 14.1990 |
| d6 | 17.1452 | 6.6315 | 0.6000 |
| d12 | 3.5766 | 10.1476 | 21.1244 |
| d14 | 5.7104 | 4.9254 | 4.3998 |

NUMERICAL EXAMPLE 3

The zoom lens system of Numerical Example 3 corresponds to Embodiment 3 shown in FIG. 8. Table 9 shows the surface data of the zoom lens system of Numerical Example 3. Table 10 shows the aspherical data. Table 11 shows various data in an infinity in-focus condition. Table 12 shows various data in a close-object in-focus condition.

TABLE 9

(Surface data)

| Surface number | r | d | nd | vd |
|---|---|---|---|---|
| Object surface | ∞ | | | |
| 1* | 15.78210 | 0.80000 | 1.85400 | 40.4 |
| 2* | 9.12530 | 5.45050 | | |
| 3* | −16.56950 | 0.60000 | 1.58700 | 59.6 |
| 4* | 77.97690 | 0.20000 | | |
| 5 | 18.36590 | 1.17940 | 2.00272 | 19.3 |
| 6 | 28.11850 | Variable | | |
| 7* | 11.62750 | 1.87230 | 1.75550 | 45.6 |
| 8* | 106.41840 | 1.11400 | | |
| 9 (Diaphragm) | ∞ | 2.00000 | | |
| 10 | 20.59090 | 0.40000 | 1.90366 | 31.3 |
| 11 | 7.48610 | 2.92480 | 1.49700 | 81.6 |
| 12 | −28.73240 | 0.50000 | | |
| 13 | 29.59400 | 1.30000 | 1.56732 | 42.8 |
| 14 | −122.15880 | Variable | | |
| 15* | 38.37840 | 0.40000 | 1.81000 | 41.0 |
| 16* | 9.04180 | Variable | | |
| 17* | 63.45900 | 3.58470 | 1.75550 | 45.6 |
| 18* | −36.13590 | (BF) | | |
| Image surface | ∞ | | | |

TABLE 10

(Aspherical data)

Surface No. 1

K = 0.00000E+00, A4 = 0.00000E+00, A6 = 5.99515E−07,
A8 = 0.00000E+00 A10 = 0.00000E+00
Surface No. 2

K = 0.00000E+00, A4 = −2.47760E−05, A6 = −1.49379E−08,
A8 = 9.35895E−09 A10 = 1.19674E−11
Surface No. 3

K = 0.00000E+00, A4 = −1.55227E−05, A6 = 4.44467E−07,
A8 = 1.62023E−08 A10 = −1.66412E−10
Surface No. 4

K = 0.00000E+00, A4 = 0.00000E+00, A6 = 1.14114E−06,
A8 = 0.00000E+00 A10 = 0.00000E+00
Surface No. 7

K = 0.00000E+00, A4 = −3.55890E−05, A6 = −5.87816E−07,
A8 = 2.39229E−08 A10 = −2.31393E−09

TABLE 10-continued (Aspherical data)

Surface No. 8

K = 0.00000E+00, A4 = 5.59122E−05, A6 = −8.26971E−07,
A8 = 1.66233E−08 A10 = −2.32755E−09
Surface No. 15

K = 0.00000E+00, A4 = −2.83318E−04, A6 = 2.24454E−07,
A8 = −1.44655E−08 A10 = 7.84135E−10
Surface No. 16

K = 0.00000E+00, A4 = −2.71306E−04, A6 = −2.85318E−06,
A8 = 0.00000E+00 A10 = 0.00000E+00
Surface No. 17

K = 0.00000E+00, A4 = 4.73183E−05, A6 = −1.18300E−07,
A8 = 0.00000E+00 A10 = 0.00000E+00
Surface No. 18

K = 0.00000E+00, A4 = −9.29919E−06, A6 = 4.89106E−08,
A8 = 0.00000E+00 A10 = 0.00000E+00

TABLE 11

(Various data in an infinity in-focus condition)

Zooming ratio 2.79707

|  | Wide-angle limit | Middle position | Telephoto limit |
|---|---|---|---|
| Focal length | 14.4901 | 24.2339 | 40.5297 |
| F-number | 3.64044 | 5.30477 | 5.82432 |
| View angle | 40.6348 | 24.5553 | 14.9715 |
| Image height | 10.8150 | 10.8150 | 10.8150 |
| Overall length of lens system | 61.5690 | 57.7455 | 60.3986 |
| BF | 14.1990 | 14.1990 | 14.1990 |
| d6 | 15.9237 | 6.4273 | 0.6000 |
| d14 | 3.2316 | 7.4620 | 14.3893 |
| d16 | 5.8888 | 7.3314 | 8.8853 |

Zoom lens unit data

| Lens unit | Initial surface No. | Focal length |
|---|---|---|
| 1 | 1 | −15.29116 |
| 2 | 7 | 13.08509 |
| 3 | 15 | −14.69287 |
| 4 | 17 | 30.95568 |

TABLE 12

(Various data in a close-object in-focus condition)

|  | Wide-angle limit | Middle position | Telephoto limit |
|---|---|---|---|
| Object distance | 300.0000 | 300.0000 | 300.0000 |
| BF | 14.1990 | 14.1990 | 14.1990 |
| d6 | 15.9237 | 6.4273 | 0.6000 |
| d14 | 3.4644 | 8.0869 | 16.0861 |
| d16 | 5.6560 | 6.7064 | 7.1885 |

NUMERICAL EXAMPLE 4

The zoom lens system of Numerical Example 4 corresponds to Embodiment 4 shown in FIG. 12. Table 13 shows the surface data of the zoom lens system of Numerical Example 4. Table 14 shows the aspherical data. Table 15 shows various data in an infinity in-focus condition. Table 16 shows various data in a close-object in-focus condition.

TABLE 13

(Surface data)

| Surface number | r | d | nd | vd |
|---|---|---|---|---|
| Object surface | ∞ |  |  |  |
| 1 | 20.78970 | 0.75000 | 1.91082 | 35.2 |
| 2 | 9.66470 | 5.38180 |  |  |
| 3* | −20.85130 | 0.45000 | 1.58700 | 59.6 |
| 4* | −1000.00000 | 0.20000 |  |  |
| 5 | 31.05800 | 1.39550 | 1.94595 | 18.0 |
| 6 | 110.64730 | Variable |  |  |
| 7* | 12.23870 | 2.08550 | 1.77200 | 50.0 |
| 8* | −173.85330 | 1.00000 |  |  |
| 9 (Diaphragm) | ∞ | 2.17440 |  |  |
| 10 | 42.56150 | 0.91310 | 1.80610 | 33.3 |
| 11 | 7.04990 | 2.63610 | 1.49700 | 81.6 |
| 12 | −27.37000 | 1.50000 |  |  |
| 13 | 43.19420 | 1.25580 | 1.53172 | 48.8 |
| 14 | −206.12520 | Variable |  |  |
| 15* | −175.97430 | 0.30000 | 1.81000 | 41.0 |
| 16* | 13.23860 | Variable |  |  |
| 17* | 46.66870 | 3.36070 | 1.81000 | 41.0 |
| 18* | −48.04510 | (BF) |  |  |
| Image surface | ∞ |  |  |  |

TABLE 14

(Aspherical data)

Surface No. 3

K = 0.00000E+00, A4 = 7.69222E−05, A6 = −3.15767E−06,
A8 = 3.88535E−08 A10 = −2.93421E−10
Surface No. 4

K = 0.00000E+00, A4 = 3.22844E−05, A6 = −3.16521E−06,
A8 = 3.65830E−08 A10 = −2.45708E−10
Surface No. 7

K = 0.00000E+00, A4 = −3.89924E−05, A6 = 1.23500E−06,
A8 = −5.24843E−08 A10 = 7.15332E−10
Surface No. 8

K = 0.00000E+00, A4 = 4.14186E−05, A6 = 1.03201E−06,
A8 = −5.09447E−08 A10 = 7.48549E−10
Surface No. 15

K = 0.00000E+00, A4 = 1.00000E−04, A6 = −6.51647E−06,
A8 = 1.03955E−07 A10 = 3.85551E−10
Surface No. 16

K = 0.00000E+00, A4 = 1.23214E−04, A6 = −6.41298E−06,
A8 = 7.58562E−08 A10 = 3.50682E−10
Surface No. 17

K = 0.00000E+00, A4 = −2.33445E−05, A6 = 4.80516E−07,
A8 = −1.02686E−09 A10 = −3.03671E−11
Surface No. 18

K = 0.00000E+00, A4 = −3.49005E−05, A6 = 1.41732E−07,
A8 = 4.37798E−09 A10 = −5.44451E−11

TABLE 15

(Various data in an infinity in-focus condition)

Zooming ratio 2.79710

|  | Wide-angle limit | Middle position | Telephoto limit |
|---|---|---|---|
| Focal length | 14.4901 | 24.2340 | 40.5302 |
| F-number | 3.64019 | 5.61748 | 5.82496 |
| View angle | 40.0390 | 24.2623 | 14.6961 |
| Image height | 10.8150 | 10.8150 | 10.8150 |
| Overall length of lens system | 65.5690 | 59.1630 | 60.3466 |
| BF | 14.1990 | 14.1990 | 14.1990 |
| d6 | 19.8761 | 7.8944 | 0.6000 |
| d14 | 2.0672 | 6.2175 | 12.9350 |
| d16 | 6.0236 | 7.4490 | 9.2094 |

Zoom lens unit data

| Lens unit | Initial surface No. | Focal length |
|---|---|---|
| 1 | 1 | −18.10745 |
| 2 | 7 | 14.50829 |
| 3 | 15 | −15.18970 |
| 4 | 17 | 29.69817 |

TABLE 16

(Various data in a close-object in-focus condition)

|  | Wide-angle limit | Middle position | Telephoto limit |
|---|---|---|---|
| Object distance | 300.0000 | 300.0000 | 300.0000 |
| BF | 14.1990 | 14.1990 | 14.1990 |
| d6 | 19.8761 | 7.8944 | 0.6000 |
| d14 | 2.3200 | 6.9003 | 14.7863 |
| d16 | 5.7708 | 6.7662 | 7.3581 |

The following Table 17 shows the corresponding values to the individual conditions in the zoom lens systems of each of Numerical Examples.

TABLE 17

(Values corresponding to conditions)

| | Numerical Example | | | |
|---|---|---|---|---|
| Condition | 1 | 2 | 3 | 4 |
| (1) $f_{2O}/f_{2I}$ | −0.21 | −0.06 | 0.54 | 0.15 |
| (2) $d_{2O}/f_W$ | 0.26 | 0.32 | 0.21 | 0.21 |
| (3) $f_{2O}/f_W$ | 0.90 | 0.93 | 1.18 | 1.03 |
| (4) $d_1/f_W$ | 0.44 | 0.58 | 0.57 | 0.56 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

Also, the present disclosure is applicable to, among the interchangeable lens apparatuses according to the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system, in order from an object side to an image side, comprising a first lens unit having negative optical power, a second lens unit having positive optical power, a third lens unit having negative optical power, and a fourth lens unit having positive optical power, wherein
the second lens unit is, in order from the object side to the image side, composed of an object-side second lens unit and an image-side second lens unit,
the object-side second lens unit has positive optical power,
an aperture diaphragm is located between the object-side second lens unit and the image-side second lens unit, and
the following conditions (1) and (2) are satisfied:

$$-0.5 < f_{2O}/f_{2I} < 1.0 \qquad (1)$$

$$0.12 < d_{2O}/f_W < 0.35 \qquad (2)$$

where $f_{2O}$ is a composite focal length of the object-side second lens unit, $f_{2I}$ is a composite focal length of the image-side second lens unit, $d_{2O}$ is an optical axial distance from a most object side lens surface of the object-side second lens unit to the aperture diaphragm, and $f_W$ is a focal length of the entire system at a wide-angle limit.

2. The zoom lens system as claimed in claim 1, wherein the following condition (3) is satisfied:

$$0.5 < f_{2O}/f_W < 3.0 \qquad (3)$$

where $f_{2O}$ is a composite focal length of the object-side second lens unit, and $f_W$ is a focal length of the entire system at a wide-angle limit.

3. The zoom lens system as claimed in claim 1, wherein the third lens unit moves along an optical axis, in focusing from an infinity in-focus condition to a close-object in-focus condition.

4. The zoom lens system as claimed in claim 1, wherein the following condition (4) is satisfied:

$$0.30 < d_1/f_W < 0.85 \qquad (4)$$

where $d_1$ is an optical axial thickness of the first lens unit, and $f_W$ is a focal length of the entire system at a wide-angle limit.

5. The zoom lens system as claimed in claim 1, wherein fourth lens unit is fixed with respect to an image surface, in zooming from a wide-angle limit to a telephoto limit at the time of image taking.

6. The zoom lens system as claimed in claim 1, wherein the first lens unit moves along an optical axis, in zooming from a wide-angle limit to a telephoto limit at the time of image taking.

7. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

8. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

\* \* \* \* \*